(12) United States Patent
Gopalakrishnan et al.

(10) Patent No.: US 8,880,128 B1
(45) Date of Patent: Nov. 4, 2014

(54) PROXIMITY BASED ALGORITHMS TO CONTROL TRANSMIT POWER OF A USER DEVICE

(71) Applicant: Amazon Technologies, Inc., Reno, NV (US)

(72) Inventors: Varada Gopalakrishnan, Cupertino, CA (US); Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/255,467

(22) Filed: Apr. 17, 2014

Related U.S. Application Data

(62) Division of application No. 13/442,182, filed on Apr. 9, 2012, now Pat. No. 8,738,093.

(51) Int. Cl.
*H04B 1/38* (2006.01)
*H04M 1/00* (2006.01)
*H04B 1/16* (2006.01)
*H04W 52/02* (2009.01)

(52) U.S. Cl.
CPC ................... *H04W 52/0261* (2013.01)
USPC ........ 455/574; 455/100; 455/522; 455/127.5; 455/343.5

(58) Field of Classification Search
CPC ............. H04B 1/16; H04B 1/04; H04M 1/00; H01Q 11/12
USPC .................. 455/572, 100, 522, 453, 106, 450, 455/452.1, 452.2, 91, 92, 127.1, 115.1, 574, 455/127.5, 343.1, 343.2, 343.5
See application file for complete search history.

(56) References Cited

U.S. PATENT DOCUMENTS

| | | | |
|---|---|---|---|
| 6,456,856 B1 | 9/2002 | Werling et al. | |
| 7,146,139 B2 * | 12/2006 | Nevermann | 455/115.1 |
| 8,406,712 B2 | 3/2013 | West et al. | |
| 8,417,296 B2 | 4/2013 | Caballero et al. | |
| 8,457,571 B2 | 6/2013 | Kim et al. | |
| 8,483,632 B2 * | 7/2013 | Asrani et al. | 455/117 |
| 8,509,838 B2 * | 8/2013 | Lee et al. | 455/522 |
| 8,515,496 B2 | 8/2013 | Cheng et al. | |
| 8,774,853 B2 * | 7/2014 | Wilson et al. | 455/522 |
| 2009/0275293 A1 * | 11/2009 | Ida | 455/73 |
| 2011/0034135 A1 * | 2/2011 | Ali et al. | 455/103 |
| 2012/0021800 A1 * | 1/2012 | Wilson et al. | 455/550.1 |
| 2012/0164962 A1 | 6/2012 | Lin et al. | |

(Continued)

OTHER PUBLICATIONS

USPTO Non-Final Office Action for U.S. Appl. No. 13/442,182 mailed Oct. 9, 2013.
USPTO Notice of Allowance for U.S. Appl. No. 13/442,182 mailed Jan. 29, 2014.

*Primary Examiner* — Pablo Tran
(74) *Attorney, Agent, or Firm* — Lowenstein Sandler LLP

(57) ABSTRACT

Methods and systems for preventing a user device from exceeding a transmit power budget when a presence of an object is detected are described. A user device detects a presence of object that absorbs electromagnetic radiation, and in response to detection of the human body part, the user device determines a remaining amount of a transmit power budget of the user device, and calculates an amount of data that can be transmitted without exceeding the remaining amount. The user device transmits the second data at the specified transmit power level according to the calculated amount of data.

23 Claims, 12 Drawing Sheets

(56) References Cited

U.S. PATENT DOCUMENTS

| | | |
|---|---|---|
| 2012/0190398 A1 | 7/2012 | Leukkunen |
| 2012/0213172 A1 | 8/2012 | Kim et al. |
| 2012/0214422 A1* | 8/2012 | Shi et al. .................. 455/67.11 |
| 2012/0252378 A1* | 10/2012 | Teshima .................. 455/90.1 |
| 2013/0169348 A1 | 7/2013 | Shi |
| 2013/0210477 A1 | 8/2013 | Peter |
| 2013/0237777 A1 | 9/2013 | Patel |

* cited by examiner

PROXIMITY BASED ALGORITHMS TO CONTROL TRANSMIT POWER OF A USER DEVICE

RELATED CASES

This application is a divisional of U.S. patent application Ser. No. 13/442,182, filed on Apr. 9, 2012, the entire contents of which are hereby incorporated by reference herein.

BACKGROUND

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. These electronic devices wirelessly communicate with a communications infrastructure to enable the consumption of the digital media items. Typically, the communications infrastructure dictates transmit power levels for the electronic devices to use when transmitting data to the communications infrastructure. The electronic devices do not include transmit power managers for making their own determinations regarding what transmit power levels to use.

Some bodies of research suggest that radiation output by electronic devices during wireless transmission of data can cause damage to the human body when such radiation is absorbed. However, since electronic devices lack the ability to control their transmit power levels, such electronic devices cannot adjust their transmit power levels to reduce user exposure to radiation. This may also consequently cause these electronic devices to fail to comply with FCC regulations regarding the specific absorption rate (SAR) permitted to electronic devices. SAR is a measure of the rate at which energy is absorbed by the body when exposed to a radio frequency (RF) electromagnetic field. In addition, the user's body can block the RF electromagnetic field in the direction of the user's body, thus reducing the gain in that direction. This may also cause difficulty in meeting the SAR requirements.

Some electronic devices are capable of connecting with multiple wireless communication infrastructures concurrently. Each such connection to a wireless communication infrastructure causes radiation to be emitted, thus causing such devices to expose users to even greater amounts of radiation.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
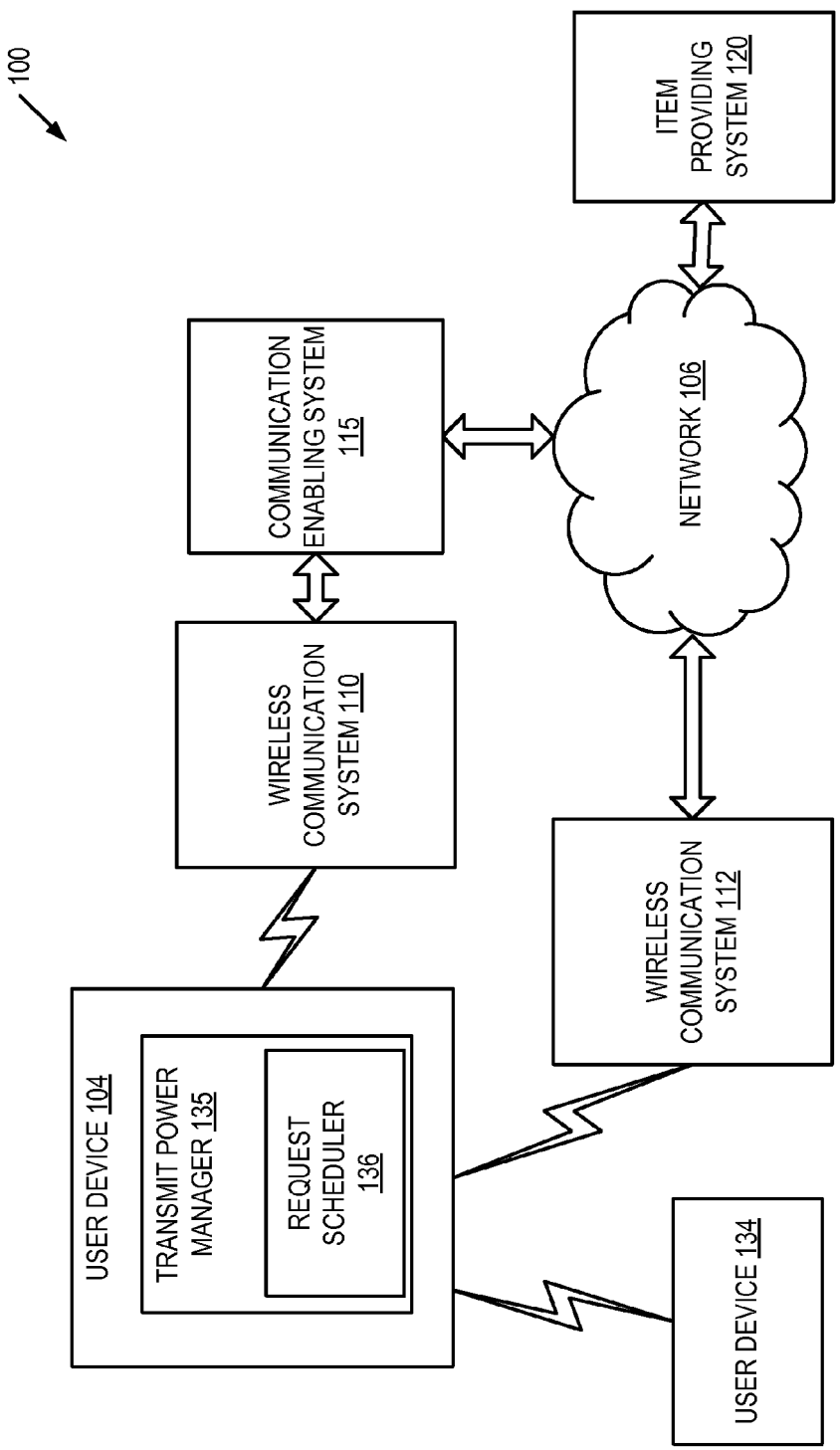
FIG. 1 is a block diagram of an exemplary network architecture in which embodiments of a transmit power manager, having a request scheduler, may operate.

Methods and systems for selecting a number of requests for transmission information by a user device when a presence of an object is detected are described. A user device detects a presence of object that absorbs electromagnetic radiation, and in response, selects a number of scheduled requests for transmission of additional information. The user device transmits the additional information at the specified transmit power level using the selected number of requests when the presence of the object is detected. In one embodiment, the additional information would normally be transmitted using a specified number of scheduled requests. When the presence of the object is detected, the user device reduces the specified number of scheduled requests. As described herein, scheduling requests are sent by a user device to a network to request one or more resources. In response, the user device receives schedule grants from the network to allocate the resource. The embodiments described herein are directed to decreasing the amount of time of transmission by sending fewer scheduled requests, instead of reducing the transmit power level at which the data is transmitted. The user device may be any content rendering device that includes a wireless modem for connecting the user device to a network. Examples of such user devices include electronic book readers, cellular telephones, personal digital assistants (PDAs), portable media players, tablet computers, netbooks, and the like.

In one embodiment, the user device detects a presence of an object that absorbs electromagnetic radiation, and in response, reduces a number of scheduled requests for transmission of additional information. The user device transmits the additional information at the specified transmit power level using the reduced number of scheduled requests when the presence of the human body part is detected. This may be used to reduce a specific absorption rate (SAR). Alternatively, this may be used to increase performance of the user device or to improve a user's experience while operating the device. In one embodiment, the user device can detect a presence of a human body part. In other embodiments, the user device can detect a presence of other types of objects that absorb electromagnetic radiation, such as non-human body parts or a SAR phantom, and the user device can reduce the number of transmits per frame when the object is detected in order to reduce the SAR into the object as would be appreciated by one of ordinary skill in the art having the benefit of this disclosure. In another embodiment, in response to detection of the human body part, the user device determines a remaining amount of a transmit power budget of the user device, and calculates an amount of data that can be transmitted without exceeding the remaining amount. The user device transmits the second data at the specified transmit power level according to the calculated amount of data.

As SAR is dependent on the average power transmitted, by reducing the number of scheduled requests, the average transmitted power can be reduced when the user device is in proximity to a person (e.g., a human body part) or a SAR phantom as used during testing of SAR for the user device. The embodiments described herein have the ability to detect when the user device is in proximity to a human body part and can reduce the time of transmission of the data to reduce the SAR. Alternatively, the embodiments described herein can be used to determine a type of application data being transmitted and make determinations of how much and when to transmit the data to reduce the amount of transmission time, effectively reducing SAR. Alternatively, other approaches may be used to reduce the transmission time to reduce SAR or to increase the user's experience on the user device as would be appreciated by one of ordinary skill in the art having the benefit of this disclosure.

FIG. 1 is a block diagram of an exemplary network architecture 100 in which embodiments of a transmit power manager 135, having a request scheduler 136, may operate. The network architecture 100 may include an item providing system 120 and one or more user devices 104 capable of communicating with the item providing system 120 via a network 106 (e.g., public network such as the Internet or private network such as a local area network (LAN)).

The user devices 104 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 104 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 120 and the user devices 104 deliver and/or receive items, upgrades, and/or other information via the network 106. For example, the user devices 104 may download or receive items from the item providing system 102. The item providing system 120 also receives various requests, instructions and other data from the user devices 104 via the network 106. The item providing system 120 may include one or more machines (e.g., one or more server computer systems, routers, gateways, etc.) that have processing and storage capabilities to provide the above functionality.

Communication between the item providing system 120 and the user device 104 may be enabled via any communication infrastructure. One example of such an infrastructure includes a combination of a wide area network (WAN) and wireless infrastructure, which allows a user to use the user device 104 to purchase items and consume items without being tethered to the item providing system 120 via hardwired links. The wireless infrastructure may be provided by one or multiple wireless communications systems, such as wireless communications system 110 and wireless communication system 112. One of the wireless communication systems 110, 112 may be a wireless fidelity (WiFi) hotspot connected with the network 106. Another of the wireless communication systems 110, 112 may be a wireless carrier system that can be implemented using various data processing equipment, communication towers, etc. Alternatively, or in addition, the wireless carrier system may rely on satellite technology to exchange information with the user device 104.

The communication infrastructure may also include a communication-enabling system 115 that serves as an intermediary in passing information between the item providing system 120 and the wireless communication system 110. The communication-enabling system 115 may communicate with the wireless communication system 110 (e.g., a wireless carrier) via a dedicated channel, and may communicate with the item providing system 120 via a non-dedicated communication mechanism, e.g., a public Wide Area Network (WAN) such as the Internet.

In one embodiment, while the user device 104 is connected with the wireless communication system 110 and/or wireless communication system 112, one or both of the wireless communication systems periodically or continuously specifies transmit power levels for the user device 104 to use for transmissions to that wireless communication system 110, 112. For example, conventional wireless carrier systems dictate what transmit power levels mobile phones are to use for communications with the wireless carrier systems. The transmit power levels that the wireless carrier systems specify continuously vary based on environmental factors such as a current signal to noise ratio, distance between the mobile phone and a nearest cell tower, obstacles between the mobile phone and the nearest cell tower, and so on. Unfortunately, wireless communication systems 110, 112 typically consider only signal strength when specifying what transmit power levels the user device is to use in transmissions of data. Wireless communication systems 110, 112 typically do not take into consideration radiation emitted by the user device 104 that may be absorbed by users of the user device 104, interference with other wireless connections, battery life of the user device 104, or other factors that may also be important to a user when specifying transmit power levels. Additionally, the user device 104 may have additional information that is not available to the wireless communication systems 110, 112. This additional information may be used to help determine what transmit power levels should be used. For example, the additional information may be whether the user device is in proximity with a human body part, and reduce the power accordingly.

In addition to, or in place of, other efforts to control the transmit power levels of the user device independent of the specified transmit power levels dictated by the wireless communication systems 110, 112, the embodiments described herein reduce the power of the user device by reducing the time of transmission, such as by reducing the number of scheduled requests used for data transmission. The embodiments described herein overcome the above shortcomings by reducing the number of scheduled requests when the user device is touching or in close proximity to a human body part. By reducing the power of the user device when the user device is touching or in close proximity to a human body part, SAR is reduced for the user device.

In one embodiment, the user device 104 includes a transmit power manager 135 that receives a specified transmit power level from the wireless communication system 110 in response to the declared power level by the user device. The power manager 135 can transmit information at the specified transmit power level using a first number of scheduled requests. The power manager 135 can also perform its own analysis to determine what transmit power levels should be used for the transmission of data to the wireless communication system 110. In another embodiment, the user device 104 performs operations to reduce transmission time using a request scheduler 136. For example, the wireless communication system 110 may send a command that the user device is to transmit at a maximum transmit power level, and the request scheduler 136 instructs the modem when data can be transmitted. During normal operation, the request schedule 136 can transmit the data at the maximum transmit power level. When user device 104 detects the presence of a human body part, and, in response, the request scheduler 136 can reduce the number of scheduled requests for transmission of the data and transmit the data at the maximum transmit power level, but with more delay in between; thus, reducing the transmission time, i.e., the time that the user device is transmitting at the maximum transmit power level. In another embodiment, the request scheduler 136 can determine a remaining amount of a transmit power budget of the user device, and calculate an amount of data that can be transmitted without exceeding the remaining amount. The request schedule 136 instructs the modem to transmit the additional data at the specified transmit power level, but according to the calculated amount of data. The request schedule 136 can also determine how much time delay should be in between the scheduled requests or between the amounts of data.

In addition to wirelessly connecting to a wireless communication system 110, 112, the user device 104 may also wirelessly connect with other user devices (e.g., user device 134). For example, user device 104 may form a wireless ad hoc (peer-to-peer) network with user device 134. In addition to controlling the transmit power levels used to communicate with the wireless communication systems 110, 112, the transmit power manager 135 may also control the transmit power used to communicate with other user devices 134.

Figure 2:
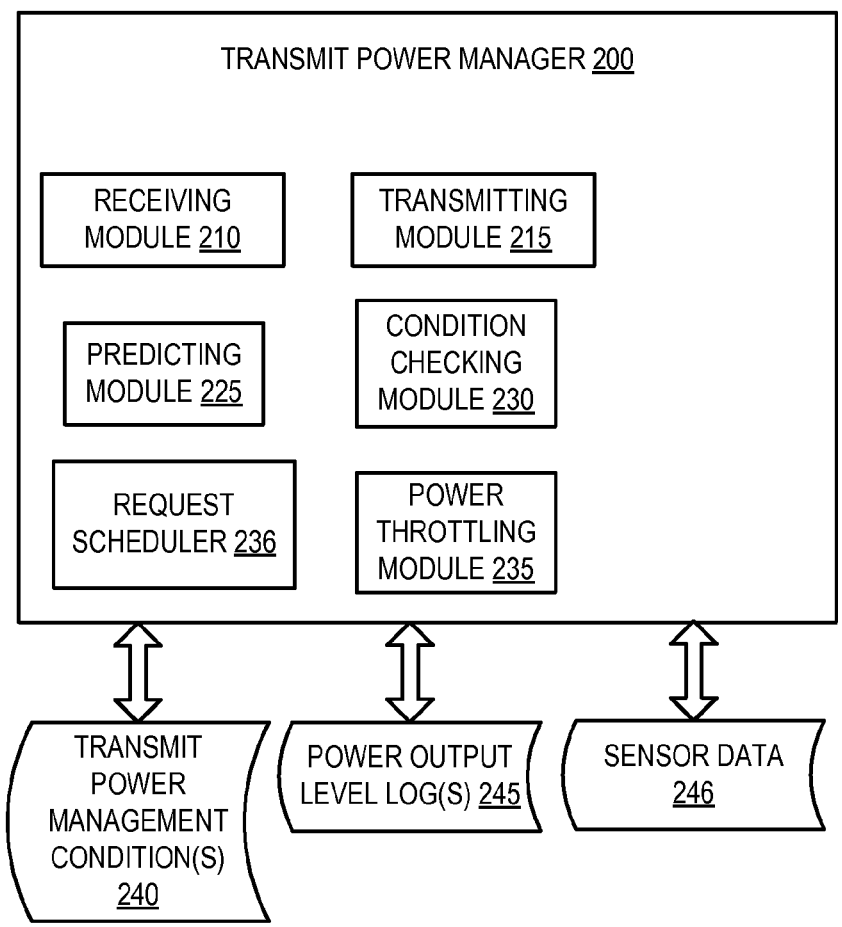
FIG. 2 is a block diagram of one embodiment of a transmit power manager.

FIG. 2 is a block diagram of one embodiment of a transmit power manager 200, which may correspond to the transmit power manager 135 of FIG. 1. In one embodiment, the transmit power manager 200 includes a receiving module 210, a transmitting module 215, a predicting module 225, a condition checking module 230, a power throttling module 235, and a request scheduler 236, which may correspond to the request scheduler 136 of FIG. 1. Like the request scheduler 136, the request scheduler 236 can be used to change the number of scheduled requests and the delay between requests as described herein. The receiving module 210 receives commands to transmit data. The commands to transmit data may identify the specified transmit power level to use for data transmission, for example, the commands may specify that a transmit power level of +33 dbm is to be used), or may specify a current transmit power level as a change from a previously used transmit power level (e.g., an increase of 1 dbm or a decrease of 2 dbm). Commands may also indicate that a previously specified transmit power level should be used. Commands may originate from the wireless communication system, and may be routed to the transmit power manager 200 by a wireless modem and/or processor of the user device. These commands may also be received from other sources, such as applications running on the user device.

Condition checking module 230 determines whether any transmit power management conditions 240 apply to transmissions that are to be made. The transmit power management conditions 240 may include safety conditions, communications interference conditions, battery level conditions, power consumption conditions, and so on. The transmit power management conditions 240 may apply to communications via a particular wireless communication protocol, with a particular wireless communication system, associated with a particular application, etc. Some transmit power management conditions 240 may apply to multiple wireless protocols, wireless communications systems, applications, etc. For those transmit power management conditions 240 that apply to a current transmission, condition checking module 230 determines whether the conditions will be violated by the current transmission. For example, condition checking module 230 may determine whether transmit power management conditions will be violated by transmitting data at the specified transmit power level.

In one embodiment, the transmit power management conditions 240 include a human body part proximity condition. This condition may be violated (or alternatively satisfied) when a human body part is detected (e.g., when a user is holding the user device), or when a user device determines that a human body part is closer than a predetermined distance from an antenna of the user device. In one embodiment, the human body part proximity condition may be determined based on the sensor data 246. In another embodiment, the transmit management conditions 240 may include a user interaction condition indicative that a user is currently using the user device 104 to infer that a human body part is touching or in close proximity to the user device. In one embodiment, the human body part proximity condition or the user interaction condition may be computed by the processor (or other component) and provided as one of the transmit power management conditions 240 to the transmit power manager 240. Alternatively, the transmit power manager 200 may use the sensor data 246, or other user input data, to determine the human body part proximity condition or the user interaction condition based on the data.

The power management conditions 240 may include other conditions, such as maximum accumulated transmit power level condition that can be used separately or in combination with some of the other conditions to determine if the condition is violated, and to take appropriate action based on the violation. Another example is a communications interference condition for when there are two or more concurrent connections with different wireless communication system and/or user device. Another example is an active application condition that can be satisfied when a particular application (e.g., an ad hoc network application) is running on the user device or when a particular operation of a specified application is to be performed (e.g., a file transfer operation). Another example is a security condition, such as a maximum transmit distance condition, which may be satisfied when certain applications are active, when certain operations are being performed and/or when certain types of wireless connections are established. The maximum transmit distance condition may cause a transmit power level to be reduced to a level just powerful enough to transmit to nearby devices (e.g., to devices within a range of 6 feet from the user device) in order to increase transmission security by preventing devices outside of a maximum distance from receiving transmissions. Another example is a negative power throttling condition that specifies when power throttling should not occur. For example, one or more negative power throttling conditions can specify that, regardless of other power management conditions that may be violated, power throttling should not occur if a particular application is active, or a particular operation is being performed. For example, a power management condition may specify that transmit power level throttling should not occur while media items are being downloaded.

The transmit power management conditions 240 may be stored in volatile or nonvolatile memory of the user device 104. In one embodiment, the power management conditions 240 are hard coded into the user device, and cannot be modified. Alternatively, the transmit power management conditions 240 may be updated by modifying existing power management conditions, adding new power management conditions, or deleting existing power management conditions.

Returning to FIG. 2, in one embodiment, the transmit power manager 200 includes a predicting module 225 that predicts future transmit power levels that may be specified by a wireless communication system. These predictions may be used by the condition checking module 230 to predict whether transmission power management conditions 240 are likely to be violated in the future. Some transmission power management conditions 240 may also incorporate such predicted transmit power levels. For example, violation of some power management conditions 240 may be contingent upon particular transmit power level predictions. For example, if the user device determines that a maximum accumulated power output level will be reached in the near future, power throttling may begin for current transmissions to prevent such an occurrence.

In one embodiment, the power throttling module 235 reduces a transmit power level used to transmit data to the wireless carrier system by reducing transmission times when one or more transmit power management conditions 240 have been violated. In another embodiment, the request scheduler 236 can be used to reduce the scheduled requests for transmission as described herein. For example, the request scheduler 236 can receive an indication from the condition checking module 230 that the human body party proximity condition or the user interaction condition have been violated, and accordingly, reduce the number of scheduled requests to be used for data transmission. The power throttling module 235 may also reduce the transmit power level below a specified transmit power level incrementally by incrementally transitioning to lower power classes or by incrementally reducing the number of scheduled requests. In one embodiment, a suitable transmit power level is an output level that does not cause any of the transmission power management conditions to be violated. Alternatively, a suitable transmit power level may be a level that causes the transmission power management condition to stop being violated at some point in the future. For example, a suitable transmit power level may cause a trend towards eventual compliance with the violated transmission power management conditions 240.

Alternatively, the power throttling module 235 may compute or otherwise identify a suitable transmit power level, and reduce the current transmit power level to the suitable transmit power level in a single action using the appropriate power class or multi-slot class or by reducing the number of scheduled requests. For example, a transmit power management condition 240 may specify that when the human body part proximity condition or the user interaction condition is violated, the number of scheduled requests should be reduced to a predetermined number. Alternatively, the number of scheduled requests may be adjusted incrementally until the current transmit power level is at a suitable level.

Power throttling module 235 may also reduce a duty cycle for the transmissions (e.g., space out the transmissions over time). Therefore, the power throttling module may adjust both the transmit power levels used for transmission and the frequency of those transmissions.

In one embodiment, transmitting module 215 transmits data to a wireless communication system or additional user device at either a specified transmit power level (e.g., as specified by the wireless communication system) or at a transmit power level determined by the power throttling module 235. In another embodiment, transmitting module 215 transmits data to a wireless communication system or additional user device with a specified number either of scheduled requests or with a new, reduced number of scheduled requests as determined by the power throttling module 235. The transmitting module 215 may transmit the data through one or more antennas included in the user device.

Figure 3:
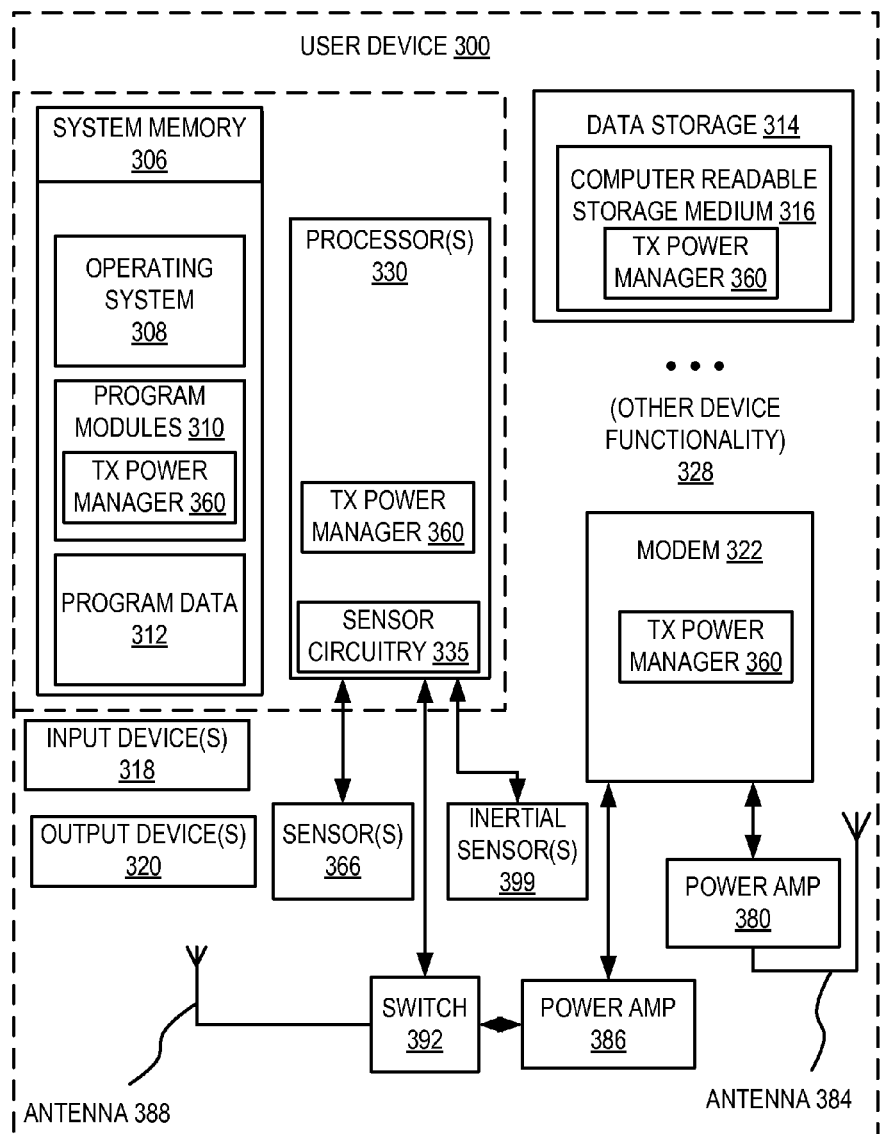
FIG. 3 is a block diagram illustrating one embodiment of an exemplary user device.

FIG. 3 is a block diagram illustrating an exemplary user device 300. The user device 300 may correspond to the user device 104 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like.

The user device 300 includes one or more processors 330, such as one or more CPUs, microcontrollers, field programmable gate arrays, or other types of processors. The user device 300 also includes system memory 306, which may correspond to any combination of volatile and/or non-volatile storage mechanisms. The system memory 306 stores information that provides an operating system component 308, various program modules 310 such as transmit (TX) power manager 360, program data 312, and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the transmit power manager 360 may reside, completely or at least partially, within the computer readable storage medium 316, system memory 306 and/or within the processor(s) 330 during execution thereof by the user device 300, the system memory 306 and the processor(s) 330 also constituting computer-readable media. The user device 300 may also include one or more input devices 318 (keyboard, mouse device, specialized selection keys, etc.) and one or more output devices 320 (displays, printers, audio output mechanisms, etc.).

The user device 300 further includes a wireless modem 322 to allow the user device 300 to communicate via a wireless network (e.g., such as provided by the wireless communication system) with other computing devices, such as remote computers, the item providing system, and so forth. The wireless modem 322 allows the user device 300 to handle both voice and non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), general packet radio service (GPRS), EDGE, universal mobile telecommunications system (UMTS), 1 times radio transmission technology (1xRTT), evaluation data optimized (EVDO), high-speed down-link packet access (HSDPA), WiFi, Long Term Evolution (LTE) and LTE Advanced (sometimes generally referred to as 4G), etc. In one embodiment, the wireless modem includes the transmit power manager 360 in addition to, or instead of, the transmit power manager 360 being included in the computer readable storage medium 316, system memory 306 and/or processor(s) 330. The transmit power manager 360 may be implemented as hardware, firmware and/or software of the wireless modem 322. It should be noted that the modem 322 may include a processing component that performs various operations to handle both voice and non-voice communications. This processing component can execute the transmit power manager 360. Alternatively, the transmit power manager 360 can be executed by a processing component of the user device, such as the processor 330 or other types of processing device as would be appreciated by one of ordinary skill in the art having the benefit of this disclosure.

The wireless modem 322 may generate signals and send these signals to power amplifier (amp) 380 or power amp 386 for amplification, after which they are wirelessly transmitted via antenna 384 or antenna 388, respectively. Antenna 384 and 388 may be configured to transmit in different frequency bands and/or using different wireless communication protocols. The antennas 384, 388 may be directional, omnidirectional, or non-directional antennas. In addition to sending data, antennas 384, 388 also receive data, which is sent to wireless modem 322 and transferred to processor(s) 330.

Though a single modem 322 is shown to control transmission to both antennas 384 and 388, the user device 300 may alternatively include multiple wireless modems, each of which is configured to transmit data via a different antenna and/or wireless transmission protocol. In one embodiment, each modem includes an independent transmit power manager. Alternatively, a single transmit power manager (e.g., that is included in system memory 306, processor 330 and/or data storage 314) may control transmit power levels used by each wireless modem. In addition, the user device 300, while illustrated with two antennas 384, 388, may include more or fewer antennas in various embodiments.

In one embodiment, user device 300 includes one or more sensors 366 such as a physical contact sensor or close proximity sensors. The sensors 366 can detect the presence of human body parts, and convey information regarding the detected presence to processor(s) 330. In one embodiment, the sensors 366 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 366 may also be optical (e.g., infrared) sensors that use an emitter and receiver pair to detect the presence of opaque objects. Alternatively, the sensors 366 may be inductive sensors, which include an inductive loop. When the presence of a human body part (or metal object) is brought close to the inductive sensor, an induction of the inductive loop changes, causing the human body part to be detected. Alternatively, the sensors 366 may be ultrasonic sensors that emit an ultrasonic signal and measure a time duration between when a signal is transmitted and the reflection of that signal received (a.k.a., flight response). The sensors 366 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, user device 300 includes one or more inertial sensors 399. The inertial sensors 399 can be used to detect motion of the user device 300. In one embodiment, the inertial sensors 399 detect linear accelerations (translational movement) and angular accelerations (rotational movement). The inertial sensors 399 may include accelerometers and/or gyroscopes. Gyroscopes use principals of angular momentum to detect changes in orientation (e.g., changes in pitch, roll, and twist). Accelerometers measure accelerations along one or more axes (e.g., translational changes). The gyroscope and accelerometer may be separate sensors, or may be combined into a single sensor. The inertial sensors 399 in one embodiment are micro-electromechanical systems (MEMS) sensors.

The processor(s) 330 may include sensor circuitry 335 (e.g., sensor device drivers) that enables the processor(s) 330 to interpret signals received from the sensor(s) 366 and/or inertial sensors 399. In one embodiment, the sensors 366 and/or inertial sensors 399 output fully processed signals to the processor(s) 330. For example, the sensors 366 may output a distance, a detected/not detected signal, etc. using a single line interface or a multi-line interface. Similarly, inertial sensors 399 may output an acceleration value (e.g., in Gs). In another embodiment, the sensors 366 output, for example, positional data and/or object presence data (e.g., of a human body part) to the processors 330 without first processing the data. Similarly, inertial sensors 399 may output, for example, voltage values that can be interpreted as acceleration values. In either instance, the processors 330 may use the sensor circuitry 335 to process and/or interpret the received data. If data is received from multiple sensors 366 and/or inertial sensors 399, processing the data may include averaging the data, identifying a maximum from the data, or otherwise combining the data from the multiple sensors. In one embodiment, in which the sensors 366 include a sensor array, numerous sensors, or a touch panel, processing the data may include determining where on the user device the human body part is located from multiple sensor readings.

In one embodiment, antenna 388 is used as a proximity sensor (e.g., as a sensor electrode for a proximity sensor). To enable the use of antenna 388 as a proximity sensor, a switch 392 disconnects the antenna 388 from power amp 386 (and thus from modem 322), and connects antenna 388 to sensor circuitry 335 and/or to a proximity sensor integrated circuit (not shown) that connects to sensor circuitry 335. While there is an electrical connection between sensor circuitry 335 and antenna 388, the antenna 388 provides signals to sensor circuitry 335. The sensor circuitry 335 processes the signals to determine whether the presence of a human body part is detected. While there is an electrical connection between antenna 388 and power amp 386, antenna 388 may be used to transmit and receive information (e.g., to maintain a wireless connection). In one embodiment, by default the switch 392 maintains an electrical connection between power amp 386 and antenna 388.

In one embodiment, processor 330 controls whether the switch 392 provides an electrical connection between the sensor circuitry 335 and the antenna 388 or between the power amp 386 and the antenna 388. Alternatively, or in addition, modem 322 may control switch 392. Switch 392 may provide an electrical connection between sensor circuitry 335 and antenna 388 on a periodic or other basis (e.g., every 500 msec or ever 1 sec). The electrical connection between the sensor circuitry 335 and the antenna 388 may then be sustained for a predetermined time period (e.g., 100 msec), after which the electrical connection between the antenna 388 and sensor circuitry 335 is terminated, and an electrical connection between the power amp 386 and the antenna 388 is established. In one embodiment, the user device determines when antenna 388 will not be sending or receiving data, at which point switch 392 establishes an electrical connection between antenna 388 and sensor circuitry 335.

Note that an additional switch (not shown) may be interposed between power amp 380 and antenna 384, which may function in the manner described above with reference to switch 392. The additional switch may have connections to sensor circuitry 335 and processor 330 as shown for switch 392.

Figure 4:
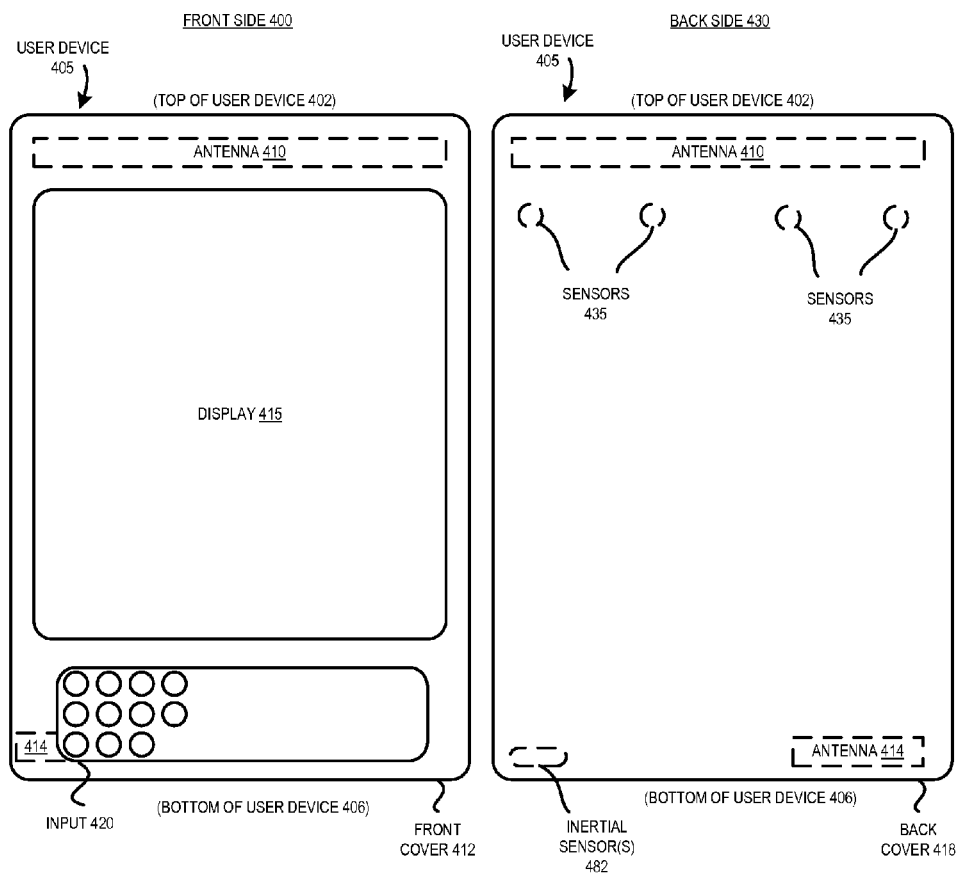
FIG. 4 illustrates an example of a front side and backside of a user device.

FIG. 4 illustrates an example of a front side 400 and backside 430 of a user device 405. The front side 400 includes a display 415 and optionally an input 420 housed in a front cover 412. The display 415 may use any available display technology, such as electronic ink (e-ink), liquid crystal display (LCD), transflective LCD, light emitting diodes (LED), laser phosphor displays (LSP), and so forth. The input 420 may include a keyboard, touch pad, or other input mechanism. In one embodiment, the display 415 and input 420 are combined into one or more touch screens.

Disposed inside the user device 405 are an antenna 410, an antenna 414, one or more sensors 435, and one or more inertial sensors 482. Note that, in some embodiments, the user device 405 may not include sensors 435, and, in other embodiments, the user device 405 may not include inertial sensors 482. As shown, the antenna 410 is positioned near a top 402 of the user device 405 and the antenna 414 is positioned near a bottom 406 of the user device 406. However, the antennas 410 and 414 may also be positioned at other locations, such as at a side of the user device 405 or near the bottom 406 of the user device 405. In one embodiment, the antennas 410, 414 are positioned less than approximately 15 cm apart, which is the distance at which interference is typically introduced between antennas in user devices such as mobile phones. Such minimal separation between the antennas can be achieved without interference problems in one embodiment of the present invention due to a fine grained control of transmit power levels provided by the transmit power manager 135. Alternatively, the user device 405 may include a single antenna or may include more than two antennas as illustrated in FIG. 4.

Disposed at a backside of the user device 405 are one or more sensors 435. The sensors 435 may be proximity sensors such as inductive sensors, capacitive sensors, magnetic sensors, infrared sensors, ultrasonic sensors, or the like. The sensors 435 may also be touch sensors such as a resistive touch sensor, a capacitive touch sensor, a mechanical touch sensor (e.g., a mechanical button), or the like. FIG. 4 illustrates four sensors 435, but more or less sensors 435 may be used. Similarly, FIG. 4 illustrates one inertial sensor 482, but more than one inertial sensor 482 may be used.

The one or more inertial sensors 482 may have fixed positions within the user device 405. The inertial sensors 482 may include gyroscope and/or accelerometer (e.g., a 3-axis accelerometer). The gyroscope and accelerometer may be separate sensors, or may be combined into a single sensor.

The antenna 410, antenna 414, sensors 435, and inertial sensors 482 are shown in the illustrated embodiment using dashed lines to indicate that these components are not on a surface of the user device 402 (e.g., that they are inside a back cover 418). However, in alternative embodiments these components may be on a surface of the user device 405.

Note that in one embodiment the sensors 435 are disposed proximate to the antenna 410 to detect when a human body part is close to the antenna 410. This may include detecting a distance between the antenna 410 and the human body part. The sensors 435 may be disposed in an approximately linear pattern as shown in FIG. 4. Alternatively, the sensors 435 may be disposed in other patterns at the backside of the user device 405. Such additional patterns may include a square pattern, an elliptical pattern, a checkerboard pattern, or other pattern. The sensors 435 may be discrete sensors (as shown), or may be linear sensor arrays, other sensor arrays, a touch panel, slider sensors, or the like. The sensors 435 may also be a single proximity. For example, a single proximity sensor may be included that is substantially equal to the size of the entire back 418 of the user device 405. As shown, the sensors 435 are disposed between the antenna 410 and the bottom 406 of the user device 405. However, one or more sensors 435 may also be disposed at other locations with relation to the antenna 410, such as between the antenna 410 and the top 402 of the user device 405. Similarly, additional sensors 435 may be disposed near the antenna 414 (not illustrated). Though sensors 435 are shown only at the backside 430 of the user device 405, the front side 400 of the user device 405 may also include other sensors. In one embodiment, as described above with reference to FIG. 3, one or both of antenna 410 and antenna 414 may function as proximity sensors. In such an embodiment, some or all of sensors 435 may be omitted. When a human body part is detected near an antenna, the transmit power level for that antenna may be throttled, including reducing the number of scheduled requests for data transmission. Alternatively, the transmit power levels for both antennas may be throttled, including reducing the number of scheduled requests for data transmission, when any sensor 535 detects the presence of a human body part.

In one embodiment, the sensors 435 may be disposed on an underside of a non-conductive substrate, which may be a rigid substrate (e.g., a printed circuit board (PCB)) or a flexible substrate (e.g., a polyimide film, polyester film, or polyether ether ketone (PEEK) film). When multiple antennas 410, 414 are used, sensors 435 may be positioned proximate to each antenna 410, 420. Alternatively, when the user device includes a single antenna the sensor 435 may be positioned proximate to the single antenna. In one embodiment, the sensors 435 are located 10 mm from the antenna 410. Alternatively, the sensors may be disposed at different locations, and may even be disposed gradually further away from the antenna 410, such as one sensor at 10 mm, another at 15 mm, another at 20 mm, and another at 25 mm, for example. Depending on which of sensors detect the presence of a human body part and/or relative strengths of detection signals generated by the sensors, a distance between the human body part and antenna may be determined.

The sensor 435 may also be disposed on inside of the back cover 418. In other embodiments, the sensors 435 may alternatively be positioned within the back cover 418 such that they are flush with the outer perimeter of the back cover 418, protrude outside of the back cover 418, or recede within the back cover 418. Some sensors 435 may also be attached to a front of the non-conductive substrate (e.g., a printed circuit board (PCB)) or to an inside of the front cover 412. The substrate may be a rigid substrate (e.g. PCB) or a flexible substrate (polyimide, polyester, polyether ether ketone, etc). The substrate may also have mounted thereon a sensor integrated circuit electrically connected to the sensors. The sensors may be spot sensors that have small sensing elements with a limited sensing range. The sensors may be strip sensor that have large sensing elements that are table to detect the proximity of a human body part across a large area, such as along a back right or left side of the user device (or a top or bottom side). In one embodiment, in which the strip sensor is a linear array of sensors or a slider sensor, the strip sensor is capable of identifying where the human body party, such as a hand, is positioned along the strip (e.g., nearer antenna 410 or antenna 414).

Inertial sensors 482 may be attached to an inside of the front cover 412 or back cover 418, attached to a top side or bottom side of a non-conductive substrate, or attached to some other component of the user device 405. Additionally, inertial sensors 482 may be positioned at a top, bottom, middle, side, or other location on the user device 405.

In one embodiment, a user's hand or leg may be in contact with the backside 418 of the user device 405. During transmission of data, antenna 410 emits a radio frequency (RF) field that may be absorbed by the portions of the human body (e.g., by the hand and/or leg). The amounts of power/radiation that may be absorbed from the RF field by the portions of the human body are based on a distance of the human body part from the antenna 410. The power of the RF field drops off at a rate of $1/d^2$, where d is distance from the antenna 410. Accordingly, the closer a human body part is to the antenna 410, the more radiation that may be absorbed. The different body parts may absorb different amounts of radiation, and the sensors 435 may be used to determine which antenna needs to be reduced. For example, the leg may only absorb a nominal amount of radiation from the RF field because of the distance between the antenna 410 and the leg. However, the hand may be close enough to the antenna 410 to possibly absorb elevated amounts of radiation. In this case, if the hand were positioned over one of sensors 435, the sensors 435 detect the presence of the hand. In some embodiments, depending on the sensor type, the sensors may detect the presence of a human body part even if the human body part is not in direct contact with the sensor 435 or not positioned directly over the sensor 435. For example, capacitive sensors, inductive sensors, optical sensors, ultrasonic sensors, and the like may detect objects that are proximate to, but not touching, the sensors. If sensors 435 are positioned across the entire backside 418 (e.g., in a sensor array), then signals from multiple sensors can be processed to visualize a size, shape and/or position of a detected object. This may enable the user device 405 to identify whether a detected object is a human body part, as well as a distance between the human body part and the antenna 410. If the antenna 410 acts as a sensor, it may be sensitive enough to detect the proximity of hand and/or leg, for example.

Upon detection of the hand, the user device 405 may throttle an output power level used to transmit data via the antenna 410, may restrict transmission of data entirely, or may reduce a number of scheduled requests used for data transmission. Such throttling or restriction may remain in place until the hand is no longer detected, at which time normal output power levels may be used for the transmission of data. Embodiments of power throttling are discussed in greater detail below with reference to FIGS. 6-11.

Figure 5:
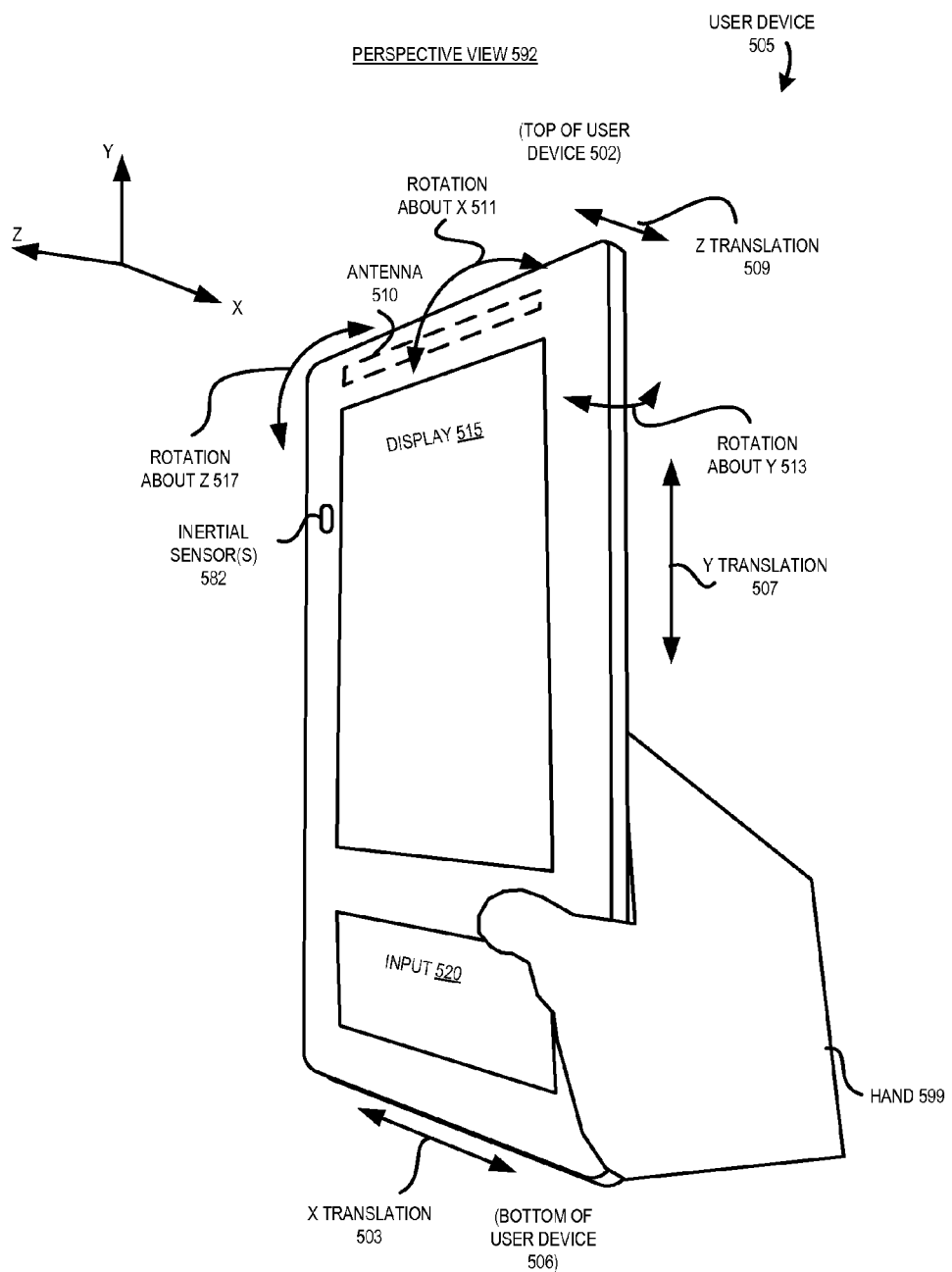
FIG. 5 illustrates a perspective view of a user device held in the hand of a user.

FIG. 5 illustrates a perspective view 592 of a user device 505 held in the hand of a user. As the user holds the user device 505, the user's hand 599 is not perfectly still. For example, the user's hand 599 may shake or otherwise move linearly in one or more directions (e.g., in an X direction, Y direction and/or Z direction). This linear (translational) motion may be registered by the inertial sensors 582 as linear acceleration in the X direction 503, linear acceleration in the Y direction 507 and linear acceleration in the Z direction 509. The user's hand 599 may also exhibit angular motion (e.g., about the X-axis, about the Y-axis and/or about the Z-axis). This motion may be registered by the inertial sensors as a rotation (or angular acceleration) about the Y-axis 513 (changes in roll), rotation (or angular acceleration) about the X-axis 511 (changes in pitch), and rotation (or angular acceleration) about the Z-axis 517 (changes in yaw). These detected motions may be used by the user device 505 to detect the presence of the hand 599 (or other human body part).

In one embodiment, the inertial sensors 582 gather motion data over a sample period, and compare the motion data to human body part presence criteria. The human body part presence criteria may include linear acceleration thresholds and/or angular acceleration thresholds. If the human body part presence criteria are satisfied (e.g., linear accelerations are above a linear acceleration threshold and angular accelerations are above an angular acceleration threshold), the user device 505 may determine that the presence of a human body part is detected. Upon such a determination, a transmit power management condition may be satisfied, and the user device 505 may throttle an output power level used to transmit data via the antenna 510 by transitioning the power class or multi-slot class or by reducing the as described herein, or may restrict transmission of data entirely. In another embodiment, the user device 505 may reduce the number of scheduled requests for data transmission, as described herein. Such throttling or restriction may remain in place until the presence of the human body part is no longer detected, at which time normal output power levels may be used for the transmission of data. Embodiments of power throttling are discussed in greater detail below with reference to FIGS. 6-11.

In one embodiment, the user device 505 determines whether the presence of a human body part is detected (e.g., whether the user device is held in a hand or resting on a leg) based on a combination of data from sensors 535 and from inertial sensors 582. For example, capacitive sensors may falsely detect the presence of a human body part when the user device 505 is resting on a metal surface. However, while the user device 505 is resting on the metal surface, the inertial sensors 582 would not detect the presence of a human body part. Similarly, inertial sensor 582 may falsely detect the presence of a human body part when the user device is in a moving vehicle, such as a car, train, bus, airplane, boat, etc., due to motions of the vehicle. However, while the user device is resting in the moving vehicle, sensors 535 may indicate that no presence of a human body part is detected. Thus, accuracy of detecting the presence of a human body part may be increased by using both the sensors 535 and inertial sensors 582.

The linear accelerations and angular accelerations detected by the inertial sensors 582 may differ depending on where a user is holding the user device 505. For example, when the user's hand 599 is holding the user device 505 near a bottom of the user device 506, inertial sensors 582 may detect first angular accelerations and linear accelerations, and when the user's hand 599 is holding the user device 505 near a top of the user device 502, inertial sensors 582 may detect second angular accelerations and linear accelerations. In one embodiment, if the inertial sensors 582 are near a top of the user device 502, then the first linear and angular accelerations may have greater magnitudes than the second linear and angular accelerations.

In one embodiment, when the presence of a human body part is detected, user device 505 uses motion data from the inertial sensors 582 to determine whether the human body part is near the bottom 506 of the user device or near the top 502 of the user device. If the human body part is near the top of the user device 502 (near antenna 510), transmit power throttling may be initiated. However, if the human body part is near the bottom of the user device 506, no transmit power throttling may be implemented.

For example, in one embodiment, when the user device 505 is resting against a leg of a user, the user's leg may be relatively motionless. Accordingly, the inertial sensors 582 may not detect motion of the user device 505 sufficient to identify the presence of a human body part when the user device 505 is resting against a user's leg. However, it has been observed that the user device 505, when tilted at particular angles, has a high probability of being held by a user.

Accordingly, in one embodiment the inertial sensors 582 are used to determine an angle of the user device 505 with respect to gravity. Gravity exerts a downward force that is measured by the inertial sensors 582 as acceleration. When the user device 505 is relatively motionless, the acceleration caused by gravity may be identified, and the angle of the user device 505 with respect to gravity may be determined. In one embodiment, if the angle with respect to gravity has a value that is less than a threshold angle (e.g., 80 degrees), the presence of a human body part is detected. Alternatively, the angle may be defined as an angle relative to horizontal (a plane normal to gravity), and the presence of a human body part may be detected when the angle with respect to horizontal is greater than a threshold value (e.g., greater than 10 degrees). Thus, the presence of a human body part may be detected using the inertial sensors 582 even when the user device 505 is motionless.

Figure 6:
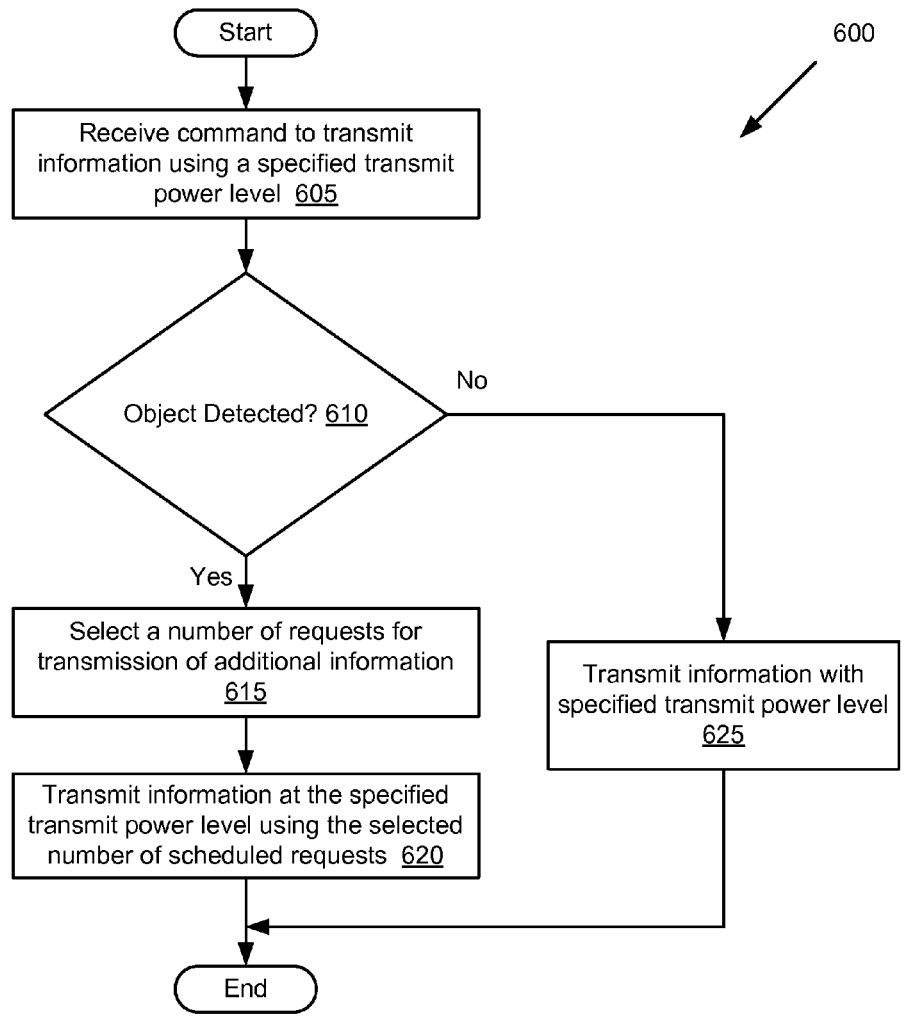
FIG. 6 is a flow diagram of an embodiment of a method for selecting a number of requests for transmitting information at a specified transmit power level in response to detecting an object.

FIG. 6 is a flow diagram of an embodiment of a method 600 for reducing a number of scheduled requests for transmitting information at a specified transmit power level in response to detecting an object. At block 605 of method 600, a command is received to transmit data with a specified transmit power level by a user device. The command may be generated by the user device and the specified transmit power level can be directed by a wireless carrier, a WiFi hotspot, or other wireless communications system. Alternatively, the command may be received from an application running on the user device (e.g., an application for creating a wireless ad hoc network).

The user device monitors for the presence of a human body part. In one embodiment, the user device monitors for the presence of the human body using one or more sensors disposed on or within the user device. Alternatively, other monitoring techniques may be used as described herein.

At block 610, the user device determines whether an object that absorbs electromagnetic radiation has been detected in proximity to the user device. For example, in one embodiment, the user device determines whether the object has been detected within a predetermined distance from one or more antenna of the user device. If no object has been detected (or has been detected within the predetermined distance), the method proceeds to block 625 to transmit information at the specified transmit power level. If a human body part has been detected within the predetermined distance, the method proceeds to block 615.

At block 615, the user device reduces a number of scheduled requests for transmission of additional information. In one embodiment, the user device communicates using LTE or HSPDA technologies and the scheduled requests are LTE scheduled requests or HSPDA requests as defined in the respective standards. Alternatively, the scheduled requests may be other types of requests that request allocation of resources from a wireless network as would be appreciated by one of ordinary skill in the art having the benefit of this disclosure. For example, WiMax (Worldwide interoperability for Microwave Access), which is defined by IEEE 801.16 standards, also uses similar request and grant mechanisms. Also, in GPRS (and EGPRS), multiple devices can share a single packet data channel using an uplink status flag (USF) in an uplink status mode to request resources. In the uplink status mode of GPRS, the transmitter may not always be on and the requests and responses may not be as straightforward as in LTE or HSPDA, but the ability to use requests is still present in the uplink status mode of GPRS.

At block 620, the user device transmits the data at the specified transmit power level using the reduced number of scheduled requests. The user device may additionally receive a command to transmit additional data using a different antenna than was used to transmit the original data. Such transmission of the additional data via the additional antenna may also be at a reduced number of scheduled requests. The wireless carrier may specify the transmit power level, such as a maximum transmit power level. Alternatively, the user device may determine the transmit power level as would be appreciated by one of ordinary skill in the art having the benefit of this disclosure. As described herein, the user device sends scheduled requests to the wireless network to request one or more resources and scheduled grants are sent by the wireless network to allocate the resources.

Figure 7:
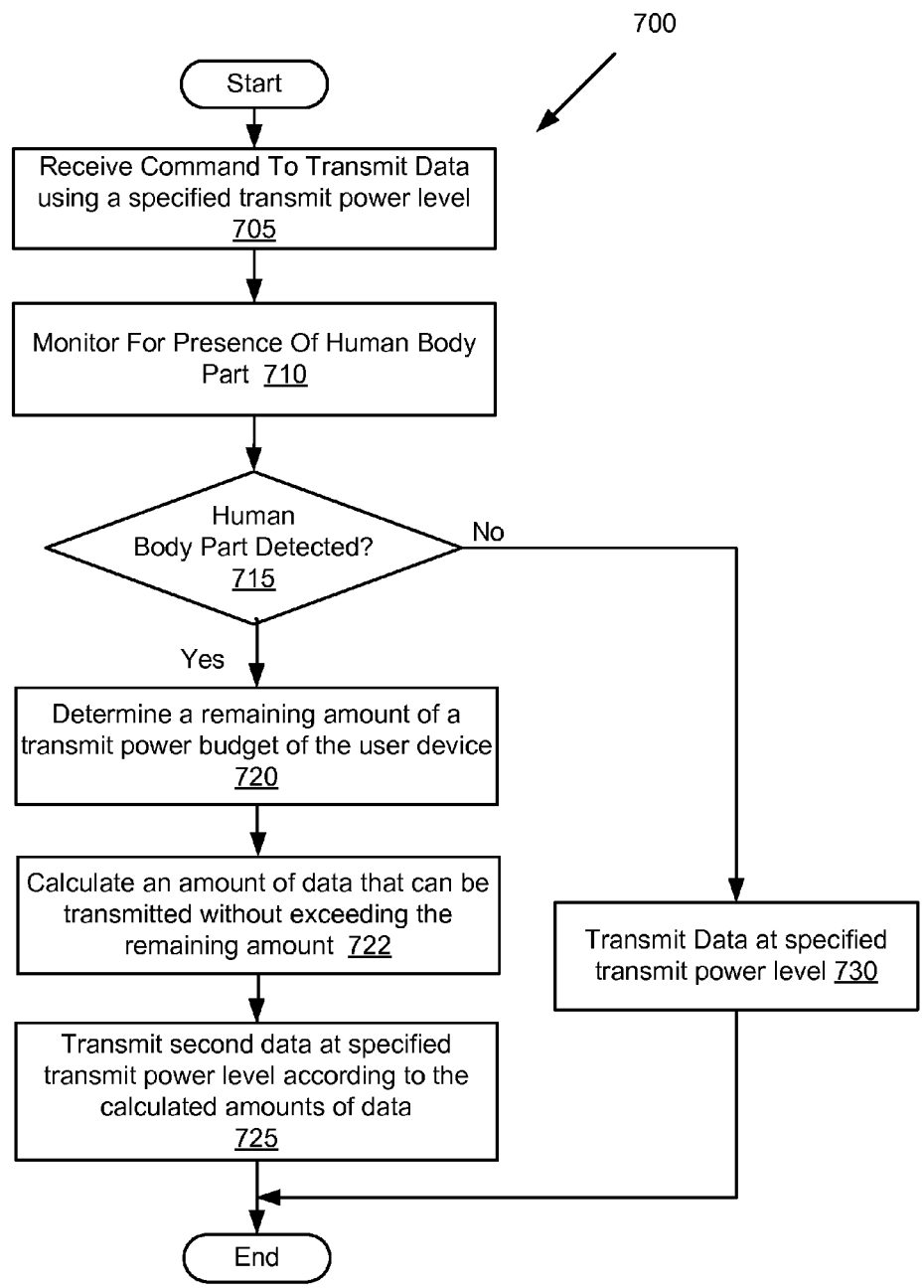
FIG. 7 is a flow diagram of an embodiment of a method for transmitting data at a specified transmit power level according to calculated amounts of data to not exceed a transmit power budget of a user device.

FIG. 7 is a flow diagram of an embodiment of a method 700 transmitting data at a specified transmit power level according to calculated amounts of data to not exceed a transmit power budget of a user device. At block 705 of the method 700, a command to transmit data with a specified transmit power level is received by a user device. The command may be received from a wireless carrier, a WiFi hotspot, or other wireless communications system. Alternatively, the command may be received from an application running on the user device (e.g., an application for creating a wireless ad hoc network).

At block 710, the user device monitors for the presence of a human body part. In one embodiment, the user device monitors for the presence of the human body using one or more sensors disposed on or within the user device. Alternatively, other monitoring techniques may be used as described herein.

At block 715, the user device determines whether a human body part has been detected on or in proximity to the user device. In one embodiment, the user device determines whether the human body part has been detected within a predetermined distance from one or more antenna of the user device. If no human body part has been detected (or has been detected within the predetermined distance), the method proceeds to block 730 and the data is transmitted at the specified transmit power level, specified at block 705. If a human body part has been detected within the predetermined distance, the method proceeds to block 720.

At block 720, the user device determines a remaining amount of transmit power budget of the user device. At block 722, the user device calculates an amount of data that can be transmitted without exceeding the remaining amount. At block 725, the user device transmits the second data at the specified transmit power level according to the calculated amount of data. The user device may additionally receive a command to transmit additional data using a different antenna than was used to transmit the original data. Such transmission of the additional data via the additional antenna may also be at according to the calculated amount of data.

In another embodiment, a user device obtains motion data from an inertial sensor (or multiple inertial sensors). The user device receives a command to transmit information at a specified transmit power level. In one embodiment, the motion data is continuously or periodically gathered and stored in a motion data cache. The motion data cache may store motion data over a sample period (e.g., motion data for the last 5 seconds). Therefore, when a command to transmit information is received, the user device may immediately determine whether the presence of a human body part is detected. In one embodiment, this determination is made prior to receiving a command to transmit information. In another embodiment, motion data is not obtained until a command to transmit information is received (e.g., operations are reversed). In this embodiment, the user device may wait a predetermined time period (e.g., 5 seconds) while it gathers motion data before continuing. The user device determines from the motion data whether the presence of a human body part is detected. The presence of a human body part may be detected when angular accelerations exceeding an angular acceleration threshold and/or linear accelerations exceeding a linear acceleration threshold are detected. The presence of a human body part may also be detected when the user device has a tilt angle that meets a tilt angle criterion (e.g., exceeds a tilt angle threshold or falls short of a tilt angle threshold). The user device may determine from the motion data whether the presence of a human body part is detected near a wireless antenna of the user device. In one embodiment, the antenna is at a top of the user device. While a user holds the user device, the user's hand will experience continuous slight involuntary motions. Depending on where the user is holding the user device, these involuntary motions may be slightly different, and will cause the inertial sensor to sense different accelerations. Based on these differences of accelerations, the user device can determine whether the user is holding the user device near the top of the user device (e.g., near the antenna) or near the bottom of the user device (e.g., away from the antenna).

If, however, the presence of a human body part is detected, the user reduces the specified number of scheduled requests to a second number of scheduled requests, and transmits the information at the specified transmit power level according to the reduced number of scheduled requests. If the presence of a human body part is not detected, the user device transmits the information at the specified transmit power level.

The user device may additionally receive a command to transmit additional data using a different antenna than was used to transmit the original data. Such transmission of the additional data via the additional antenna may also be at a reduced number of scheduled requests.

Figure 8:
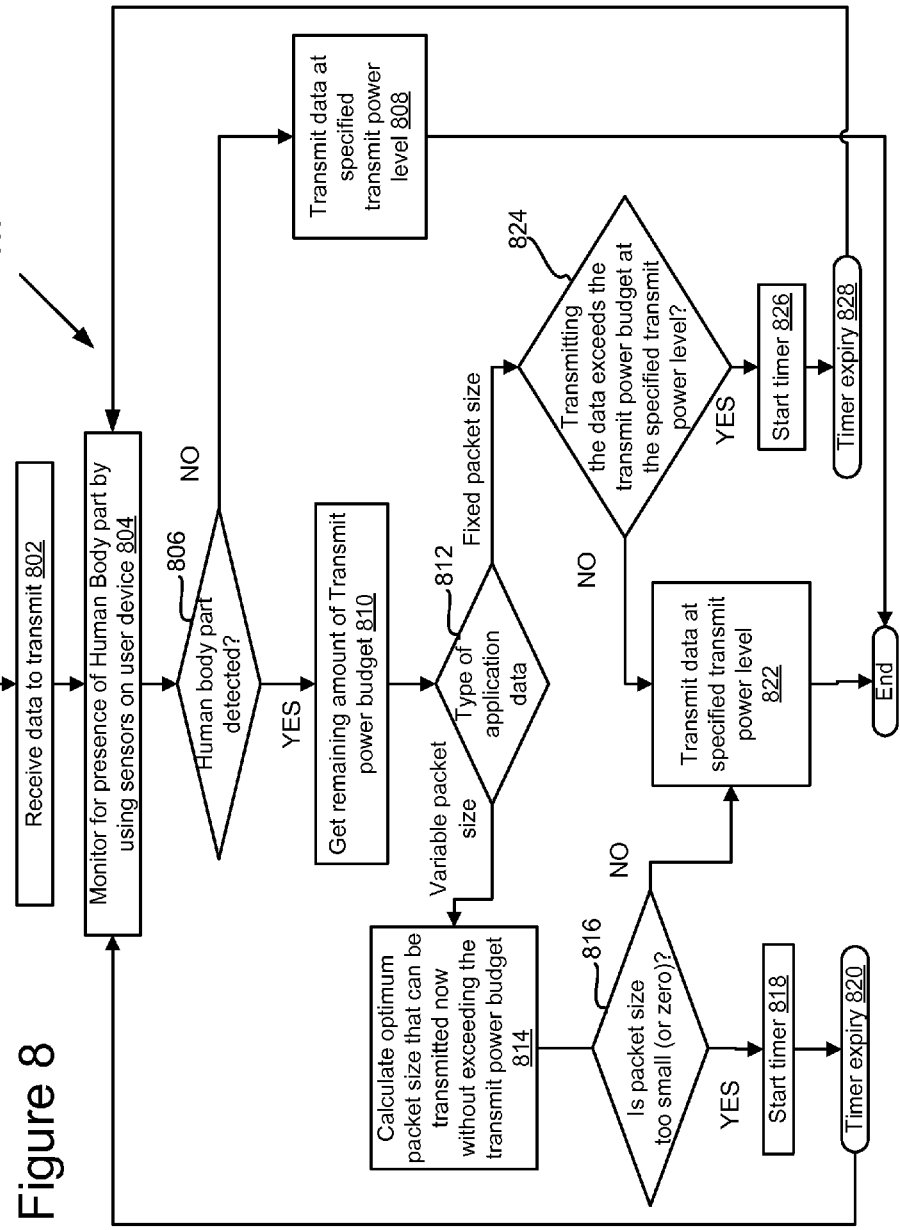
FIG. 8 is a flow diagram of another embodiment of a method for transmitting data at a specified transmit power level to not exceed a transmit power budget of a user device.

FIG. 8 is a flow diagram of another embodiment of a method 800 for transmitting data at a specified transmit power level to not exceed a transmit power budget of a user device. At block 802 of method 800, a user device receives data to transmit to another device. At block 804, the user device monitors for a presence of a human body part by using one or more sensors on or within the user device. At block 806, the user device determines whether the data from the one or more sensors indicates the presence of a human body part. If the data from the proximity sensor does not indicate the presence of a human body part, the method continues to block 808 to transmit the data at the specified transmit power level. The specified transmit power level could be up to the maximum allowed transmit power. If the data from the proximity sensor does indicate the presence of a human body part, the method continues to block 810.

At block 810, the user device obtains a remaining amount of transmit power budget of the user device. The user device, at block 812, determines a type of application. In this embodiment, the type of application could be an application that uses variable packet sizes or fixed packet sizes. For example, a streaming application, such as a VoIP call, could uses fixed packet sizes for transmitting the data. For another example, an application can transmit data, such as upload a picture, in the background using variable packet sizes. If the user device determines that the application uses variable packet sizes at block 812, the user device calculates an optimum packet size that can be transmitted now without exceeding the transmit power budget (block 814). The user device determines if the packet size is too small, such as being less than a specified threshold or zero) (block 816). If yes at block 816, the user device starts a timer (block 818) and then waits for the timer to expire (block 820) to return to block 804 to monitor for the presence of the human body part. However, if the packet size is not too small at block 816, the user device transmits the data at the specified transmit level using the optimum packet size calculated at block 814 (block 822), and the method ends. The specified transmit power level could be up to the maximum allowed transmit power.

If the user device determines that the application uses fixed packet sizes at block 812, the user device determines if transmitting the data would exceed the transmit power budget at the specified transmit power level (block 824). If not, the user device transmits the data at the specified transmit level (block 822), and the method ends. As above, the specified transmit power level could be up to the maximum allowed transmit power. If it would exceed the transmit power budget, the user device starts a timer (block 826) and then waits for the timer to expire (block 828) to return to block 804 to monitor for the presence of the human body part.

In another embodiment of the method, the user device transmits first data at a specified transmit power level when no object is present. When the user device detects a presence of an object that absorbs electromagnetic radiation, the user device determines a remaining amount of a transmit power budget of the user device, calculates an amount of data that can be transmitted without exceeding the remaining amount, and transmits second data at the specified transmit power level according to the calculated amount of data. In a further embodiment, the user device transmits the second data at the specified transmit power level when the presence of the object is not detected. In a further embodiment, the user device determines a type of application using the first data. When the type of application is a first type, the user device performs the calculation and transmission described above. When the type of application is a second type, the user device determines whether transmitting the second data would exceed the remaining amount of the transmit power budget. When transmitting the second data would exceed the remaining amount, the user device delays a specified amount of time. When the transmitting the second data would not exceed the remaining amount, the user device transmitting the second data at the specified transmit power level without the delaying.

In one embodiment, a first application of the first type uses variable-sized packets and a second application of the second type uses fixed size packets. In other embodiments, additional types may be used and other criteria to determine the application type may be used as would be appreciated by one of ordinary skill in the art having the benefit of this disclosure. In one embodiment, when the first data includes the variable-sized packets, the user device calculates a packet size that can be transmitted without exceeding the transmit power budget, determines whether the packet size exceeds a specified threshold. The user device transmits the second data at the specified transmit power level using the calculated packet size when the packet size does not exceed the specified threshold, and delays a specified amount of time when the packet size exceeds the specified threshold. In another embodiment, when the first data includes the fixed-sized packets, the user device determines whether transmitting the second data would exceed the remaining amount of the transmit power budget. When the transmitting the second data would exceed the remaining amount, the user device delays a specified amount of time. When the transmitting the second data would not exceed the remaining amount, the user device transmits the second data at the specified transmit power level without the delaying. As described herein, in one embodiment, the specified transmit power level is a maximum transmit power level.

In another embodiment of the method, the user device transmits information at a specified transmit power level. When the user device detects a presence of an object that absorbs electromagnetic radiation, the user device reduces a number of scheduled requests for transmission of additional information, and transmits the additional information at the specified transmit power level using the reduced number of scheduled requests. In a further embodiment, the object is a human body part, and the user device detects the presence of the human body part using a proximity sensor disposed on or within the user device. In another embodiment, the user device detects the presence the presence of the human body part by detecting a user interaction condition indicative of a user's interaction with the user device.

Figure 9:
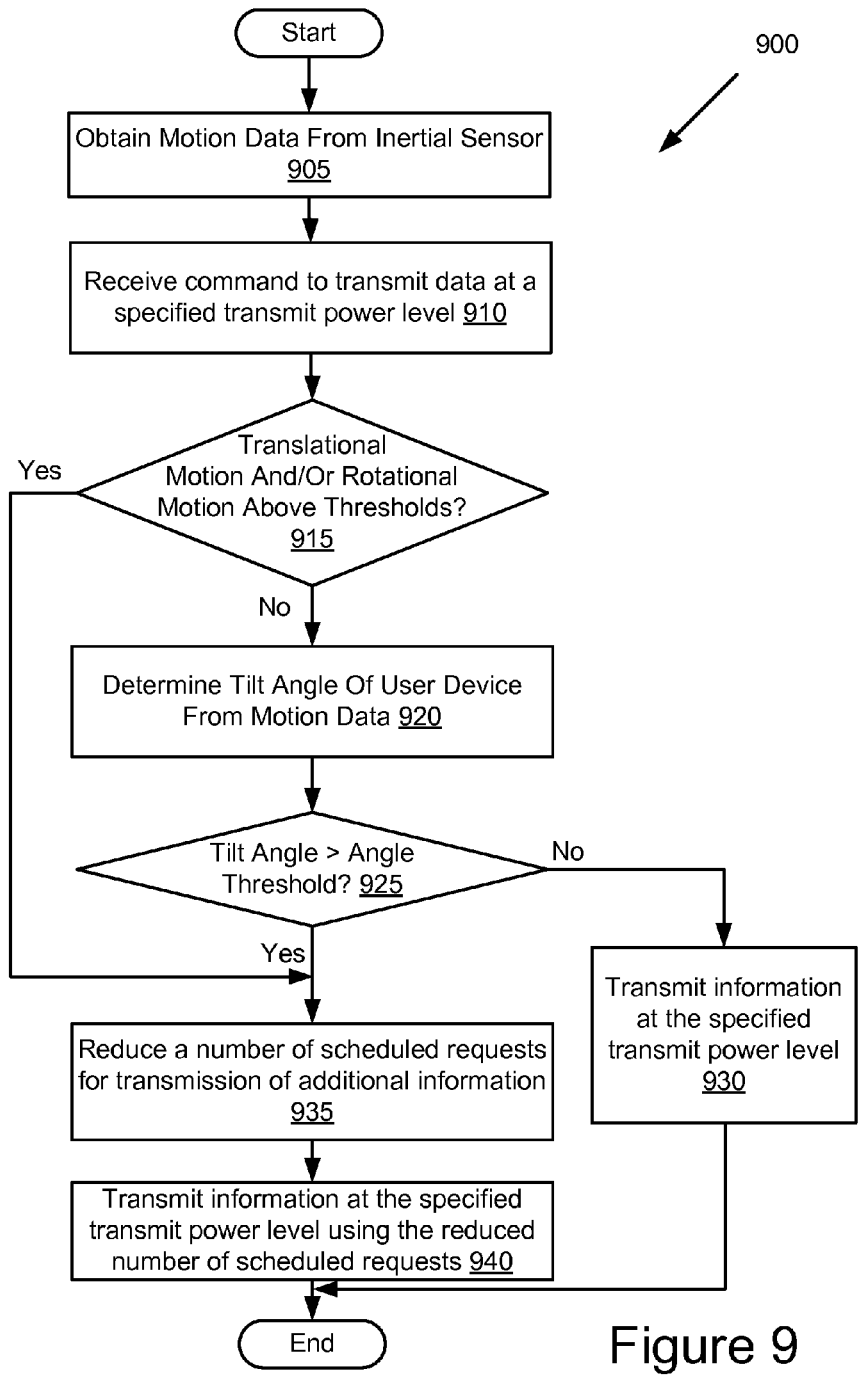
FIG. 9 is a flow diagram of another embodiment of a method for reducing the number of scheduled requests based on motion data.

FIG. 9 is a flow diagram of another embodiment of a method 900 for reducing the number of scheduled requests based on motion data. At block 905 of method 900, a user device obtains motion data from an inertial sensor (or multiple inertial sensors). At block 910, the user device receives a command to transmit information at a specified transmit power level. Alternatively, the motion data may be obtained after receiving the command to transmit the information.

At block 915, the user device determines whether the motion data includes linear accelerations that exceed a linear acceleration threshold. The user device also determines whether the motion data includes angular accelerations that exceed an angular acceleration threshold.

In one embodiment, the user device computes a human body part presence score from the angular accelerations and linear accelerations in the motion data. If the human body part presence score exceeds a threshold, the user device determines that the presence of a human body part is detected. The presence of a human body part may be more accurately detected based on angular accelerations than linear accelerations. Accordingly, in one embodiment angular accelerations are weighted more heavily than linear accelerations in the determination of whether a human body part is detected (e.g., angular accelerations have a greater contribution to the human body part presence score).

In some cases, a user device that is held by the user is more likely to experience linear accelerations in some directions than in other directions. Similarly, the user device that is held by the user may be more likely to experience angular accelerations in some directions than in other directions. Accordingly, there may be separate linear acceleration thresholds (or translational motion thresholds) for each axis of a three-axis accelerometer. Additionally, there may also be separate angular acceleration thresholds (e.g., a yaw threshold, a pitch threshold and a roll threshold). Each of the separate linear acceleration thresholds and angular acceleration thresholds may have different value. Additionally, linear accelerations along different axes may be weighted differently and angular accelerations about different axes may be weighted differently in the determination of whether the presence of a human body part is detected (e.g., whether a user is holding the user device). In one embodiment, the human body presence score is based on a weighted combination of values from linear accelerations along each of the axes and angular accelerations about the axes.

If at block 915 the translational motion and/or the rotational motion are not above motion thresholds (or the translational motion and/or rotational motion is not indicative the presence of a human body part), the method proceeds to block 920. In one embodiment, if the human body part presence score is below a threshold, then the rotational motion and translational motion is not indicative of the presence of a human body part. If the translational motion and/or the rotational motion are above motion thresholds (e.g., the human body part presence score is above a threshold), the method proceeds to block 935.

At block 920, a tilt angle of the user device is determined from the motion data. At block 925, if the tilt angle is greater than an angle threshold with respect to horizontal (or less than an angle threshold with respect to gravity), the method proceeds to block 935. Otherwise, the method proceeds to block 930, and the information is transmitted at the specified number of scheduled requests.

At block 935, the user device reduces a first number of scheduled requests to a second number of scheduled requests. At block 940, the user device then transmits the information with the second, reduced number of scheduled requests.

In embodiments where the user device is on a moving vehicle such as a car, train, bus, airplane, boat, etc., the motion data may incorrectly indicate that the presence of a human body part is detected (e.g., that the user device is in contact with a human body part). For example, motions that occurred due to car movement, train movement, and so forth may satisfy the criteria for the presence of a human body part. In one embodiment, such false positives can be reduced by filtering the data using a moving vehicle filter. In these embodiments, the user device compares the received motion data to motion signatures of one or more moving vehicle filters. Each of the motion signatures for a moving vehicle filter represents common accelerations that may be detected while the user device is on a moving vehicle of the appropriate type. By comparing the motion data to each of the motion signatures, the user device may determine which, if any, moving vehicle type the user device is on. If the motion data fails to match the motion signature of any moving vehicle filter, the method ends. If, on the other hand, the motion data matches a motion signature of a moving vehicle filter, the method may filter the obtained motion data using the identified moving vehicle filter. This may remove acceleration measurements that are caused by the moving vehicle. The remaining motion data may reflect motions that are caused by user motions (e.g., from a user holding the user device). In one embodiment, a user may select a moving vehicle filter. For example, the user may indicate that he is riding in a car, a train, etc.

Figure 10:
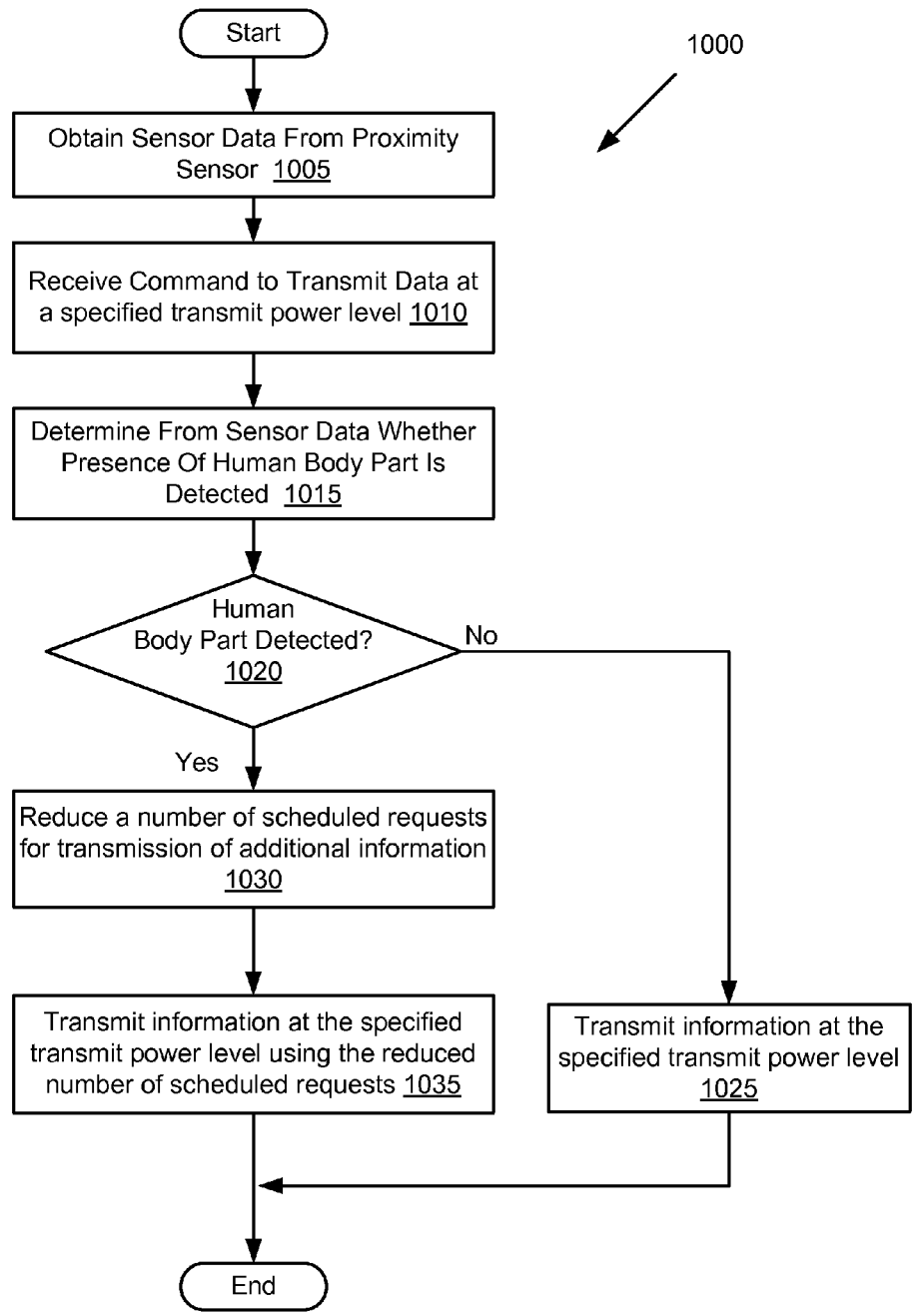
FIG. 10 is a flow diagram of another embodiment of a method for reducing the number of scheduled requests using a proximity sensor to determine a presence of a human body part.

FIG. 10 is a flow diagram of another embodiment of a method 1000 for reducing the number of scheduled requests using a proximity sensor to determine a presence of a human body part. At block 1005 of method 1000, the user device receive sensor data from a proximity sensor (or multiple proximity sensors) included in a user device to detect an object. In one embodiment, an antenna operates as the proximity sensor. The object may be a portion of a human body part. At block 1010, the user device receives a command to transmit data at a specified transmit power level. At block 1015, the user determines from the sensor data whether presence of a human body part is detected based on the sensor data. The presence of a human body part may be detected when the proximity sensors detect that the human body part is touching or in proximity to the user device. At block 1020, if the presence of a human body part is detected, the method proceeds to block 1030. If the presence of a human body part is not detected, the method proceeds to block 1025, and the information is transmitted at the specified transmit power level.

The presence may also be detected when the human body party is detected within a specified distance from the antenna. For example, the user device may determine a distance between the detected object and one or more antennas of the user device, and then may determine whether the object has been detected within a distance threshold (predetermined distance). If the distance is outside the distance threshold, the method proceeds to block 1025. If the distance is within the distance threshold, and the data is transmitted by the one or more antennas at specified number of scheduled requests. If the distance is within the distance threshold, the method proceeds to block 1030.

At block 1030, the user device reduces the specified number of scheduled requests to a second number of scheduled requests for transmission of additional information. At block 1035, the user device transmits the data with the second, reduced number of scheduled requests. The user device may additionally receive a command to transmit additional data using a different antenna than was used to transmit the original data. Such transmission of the additional data via the additional antenna may also be at a reduced number of scheduled requests.

In another embodiment, the user device waits a predetermined time period. At the end of the predetermined time period, and the user device again checks whether the distance is still within the threshold distance. If the distance is greater than the threshold distance, and the data is transmitted with a specified number of scheduled requests. If the distance is still less than the threshold distance, the user device reduces the specified number of scheduled requests and transmits the data with the reduced number of transmit slots. In another embodiment, the number of scheduled requests is reduced only for data transmitted by an antenna that is less than the threshold distance from the detected object. Alternatively, the number of scheduled requests is reduced for data transmitted by all antennas.

As described above, in some embodiments, an antenna may be used as a proximity sensor. In these embodiments, the method may determine whether it is safe to disconnect an antenna from a wireless modem that sends and receives transmissions via the antenna. If it is safe to disconnect the antenna from the wireless modem, the method causes a switch to disconnect the antenna from the modem and connect the antenna to the sensor circuitry. This may be the case, for example, if method determines that the antenna will not be or is unlikely to be needed to receive an incoming message or send an outgoing message within a predetermined time period (e.g., 100 ms or 50 ms). If it is not safe to disconnect the antenna from the modem, the method returns to determine whether it is safe to disconnect or not.

Once disconnected, the antenna is then used to monitor for the presence of a human body part. The antenna may monitor for the presence of a human body part for the predetermined time period. After the predetermined time period expires, the method causes the switch to disconnect the antenna from the sensor circuitry and reconnect the antenna to the wireless modem. The wireless modem can then resume sending and receiving transmissions.

Figure 11:
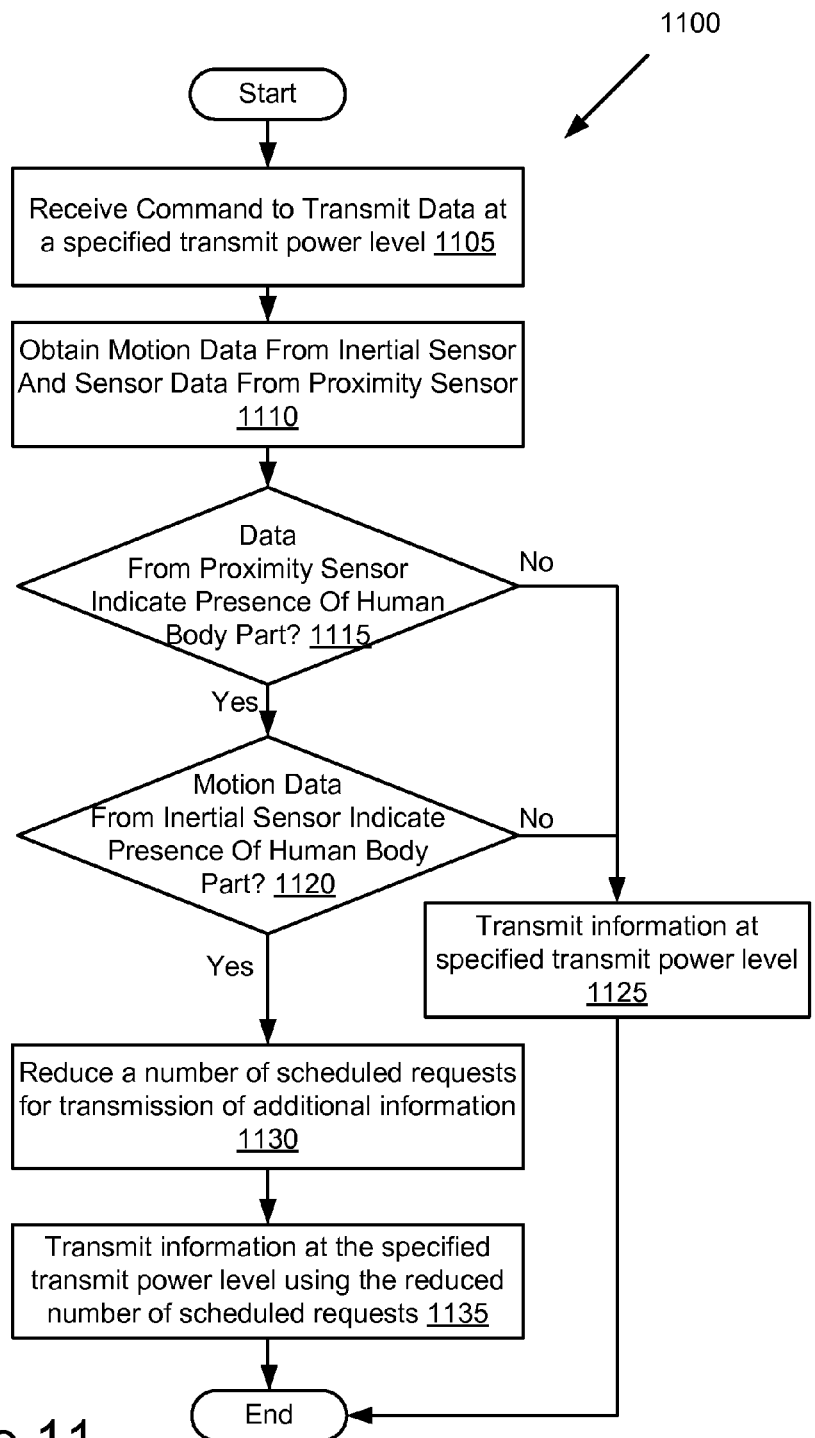
FIG. 11 is a flow diagram of another embodiment of a method for reducing the number of scheduled requests using an inertial sensor and a proximity sensor to determine a presence of a human body part.

FIG. 11 is a flow diagram of another embodiment of a method 1100 for reducing the number of scheduled requests using an inertial sensor and a proximity sensor to determine a presence of a human body part. At block 1105 of method 1100, a user device receives a command to transmit information at a specified transmit power level. At block 1110, the user device obtains motion data from an inertial sensor and additional data from a proximity sensor. The inertial data and the additional data may be used to detect the presence of a human body part.

At block 1115, the user device determines whether the data from the proximity sensor indicates the presence of a human body part. If the data from the proximity sensor does not indicate the presence of a human body part, the method continues to block 1125 to transmit the data at the specified transmit power level. If the data from the proximity sensor does indicate the presence of a human body part, the method continues to block 1120.

At block 1120, the user device determines whether the motion data from the inertial sensor indicates the presence of a human body part. If the motion data from the inertial sensor does not indicate the presence of a human body part, the method continues to block 1125 to transmit the data at the specified transmit power level. If the motion data from the inertial sensor does indicate the presence of a human body part, the method continues to block 1130.

At block 1130, the user device reduces the specified number of scheduled requests to a second number of scheduled requests. At block 1135, the user device transmits the additional data with the second, reduced number of scheduled requests. The user device may additionally receive a command to transmit additional data using a different antenna than was used to transmit the original data. Such transmission of the additional data via the additional antenna may also be at a reduced number of scheduled requests.

In the embodiments of FIG. 6 and FIGS. 9-11, the method is described in the context of reducing a number of scheduled requests. In other embodiments, the methods of FIG. 6 and FIGS. 9-11 could be modified to perform the operations at blocks 720, 722, and 725 in FIG. 7 for reducing the transmission time. Alternatively, the methods of FIG. 6 and FIGS. 9-11 could be modified to perform some or all of the operations of FIG. 8.

Figure 12:
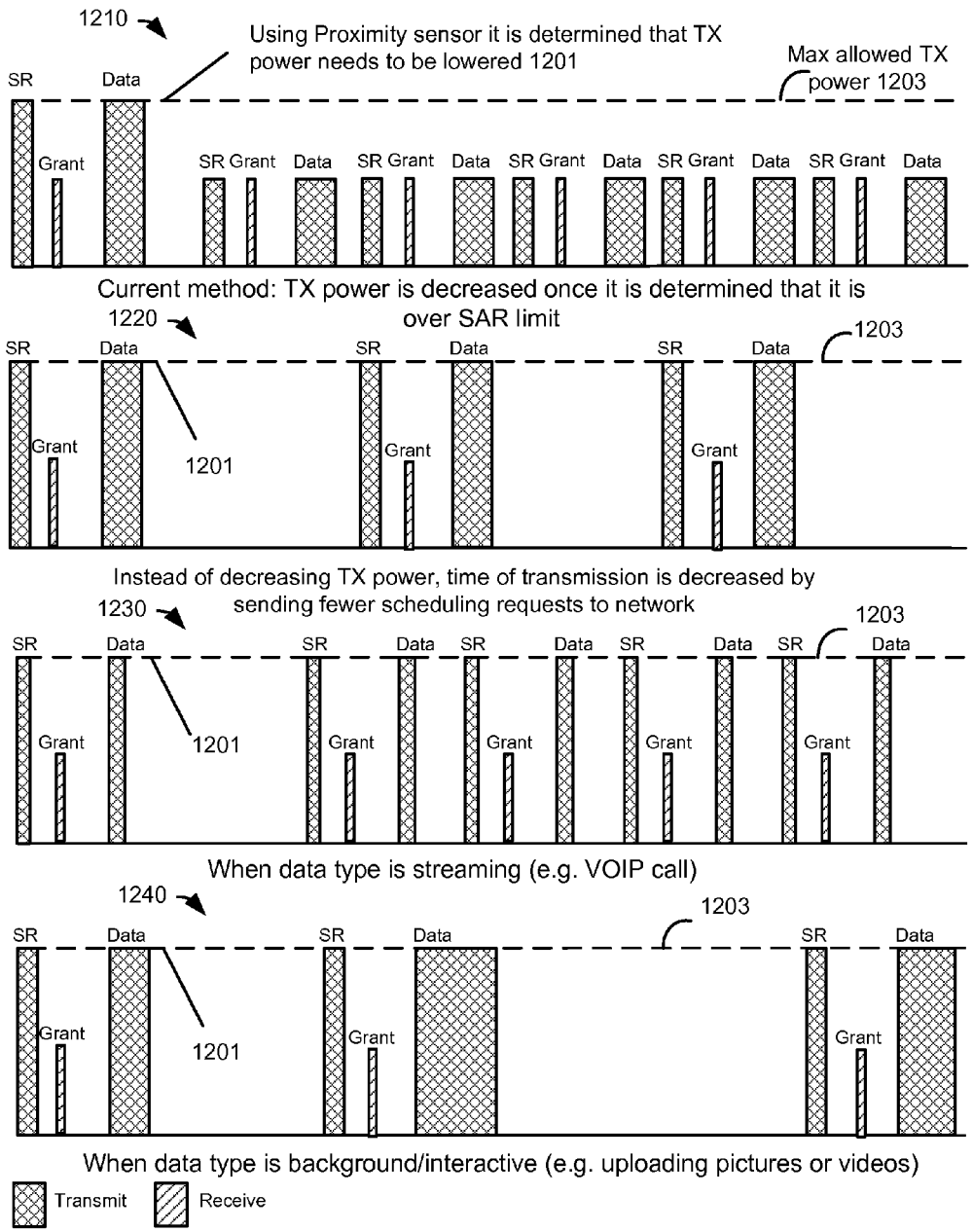
FIG. 12 are timing diagrams of various embodiments of reducing transmit power while transmitting data by reducing a number of schedule requests.

FIG. 12 are timing diagrams of various embodiments of reducing transmit power while transmitting data by reducing a number of schedule requests. Timing diagram 1210 shows scheduled requests 1202 that are sent to the network to request one or more resources and the scheduled grants 1204 that are sent by the network to allocate the resources. The timing diagram 1210 shows the scheduled requests 1202 and the grants 1204 before a proximity sensor determines that the TX power needs to be lowered 1201, as well as the scheduled requests 102 and the grants 1204 after 1201. In response to 1201, the user device reduces the transmit power for the scheduled requests 1202.

Timing diagram 1220 shows scheduled requests 1202 that are sent to the network to request one or more resources and the scheduled grants 1204 that are sent by the network to allocate the resources. The timing diagram 1220 shows the scheduled requests 1202 and the grants 1204 before a proximity sensor determines that the TX power needs to be lowered 1201, as well as the scheduled requests 102 and the grants 1204 after 1201. Unlike above, instead of reducing the transmit power to send the scheduled requests 1202, the user device reduces the number of scheduled request to the network. In effect, the user device decreases the amount of time of transmission by sending fewer scheduled requests to the network than in timing diagram 1210. The timing diagram 1220 also shows that the data is transmitted at the maximum allowed transmit power 1203. Alternatively, other specified transmit power levels that are less than the maximum allowed transmit power 1203 can be used as would be appreciated by one of ordinary skill in the art having the benefit of this disclosure.

Timing diagram 1230 also shows that fewer scheduled requests are sent in order to transmit data that is of a first application type in which the data type is streaming data, for example, data transmitted during a VOIP call. Timing diagram 1240 also shows that fewer scheduled requests are sent in order to transmit data that is of a second application type in which the data type is background or interactive data, for example, data transmitting while uploading pictures or videos to the network. As shown in diagrams 1230 and 1240, the amount of data transmitted in diagram 1230 is less than the data transmitted in 1240, but is transmitted more frequently than the data in diagram 1240. Also, the delay between the scheduled requests 1202 in diagram 1230 can be smaller than the delay between scheduled requests 1202 in diagram 1240. The depicted embodiments illustrate some examples of scheduled requests 1202 and corresponding grants 1204. Of course, the amount of data and the frequency of the scheduled requests 1202 (e.g., delays between scheduled requests 1202) may differ in other embodiments as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method, implemented by a user device programmed to perform the following, comprising:
    transmitting first data at a specified transmit power level;
    detecting a presence of an object that absorbs electromagnetic radiation; and
    in response to the detection of the presence of the object,
        determining a remaining amount of a transmit power budget of the user device,
        calculating an amount of data that can be transmitted without exceeding the remaining amount, and
        transmitting second data at the specified transmit power level according to the calculated amount of data.

2. The method of claim 1, further comprising transmitting the second data at the specified transmit power level when the presence of the object is not detected.

3. The method of claim 1, further comprising:
    determining a type of application using the first data;
    when the type of application is a first type, performing the calculating and the transmitting the second data; and
    when the type of application is a second type,
        determining that transmitting the second data would exceed the remaining amount of the transmit power budget, and
        delaying a specified amount of time.

4. The method of claim 3, wherein the type of application is the second type, and wherein the method further comprises:
    determining that transmitting the second data would not exceed the remaining amount of the transmit power budget; and
    transmitting the second data at the specified transmit power level without the delaying.

5. The method of claim 3, wherein a first application of the first type uses variable-sized packets and a second application of the second type uses fixed-size packets.

6. The method of claim 1, further comprising determining whether the first data comprises variable-sized packets or fixed-sized packets.

7. The method of claim 1, wherein the first data comprises variable-sized packets, and wherein the method further comprises:

calculating a packet size that can be transmitted without exceeding the transmit power budget;
determining that the packet size exceeds a specified threshold; and
delaying a specified amount of time.

8. The method of claim 7, wherein the first data comprises variable-sized packets, and wherein the method further comprises:
calculating a packet size that can be transmitted without exceeding the transmit power budget;
determining that the packet size does not exceed a specified threshold; and
transmitting the second data at the specified transmit power level using the calculated packet size.

9. The method of claim 5, wherein the first data comprises the fixed-sized packets, and wherein the method further comprises:
determining that transmitting the second data would exceed the remaining amount of the transmit power budget; and
delaying a specified amount of time.

10. The method of claim 5, wherein the first data comprises the fixed-sized packets, and wherein the method further comprises:
determining that transmitting the second data would not exceed the remaining amount of the transmit power budget; and
transmitting the second data at the specified transmit power level without the delaying.

11. The method of claim 1, wherein the specified transmit power level is a maximum transmit power level.

12. The method of claim 1, wherein the user device is at least one of an electronic book reader, a cellular telephone, a personal digital assistant, a portable media player, a tablet computer, or a netbook.

13. The method of claim 1, wherein the object is a human body part, and wherein the detecting the presence of the human body part comprises detecting the presence of the human body party using a proximity sensor disposed on or within the user device.

14. The method of claim 1, further comprising determining a number of scheduled requests for transmission of the second data.

15. The method of claim 14, wherein the scheduled requests are at least one of Long Term High-Speed Downlink Packet Access (HSDPA) scheduled requests, Long Term Evolution (LTE) scheduled requests, Worldwide interoperability for Microwave Access (WiMax) requests, or general packet radio service (GPRS) requests.

16. A user device, comprising:
an antenna configured to transmit first data at a specified transmit power level;
a processing component to receive sensor data from a sensor and to detect, based on the sensor data, a presence of an object that absorbs electromagnetic radiation; and
a power manager, configured to be executed from a memory by the processing component, the power manager, in response to the detection of the presence of the object, is to:
determine a remaining amount of a transmit power budget of the user device,
calculate an amount of data that can be transmitted without exceeding the remaining amount, and
control the antenna to transmit second data at the specified transmit power level according to the calculated amount of data.

17. The user device of claim 16, wherein the power manager is further to:
determine a type of application using the first data;
when the type of application is a first type, performing the calculating and the transmitting the second data; and
when the type of application is a second type,
determine that transmitting the second data would exceed the remaining amount of the transmit power budget, and
delay a specified amount of time.

18. The user device of claim 17, wherein the type of application is the second type, and wherein the power manager is further to:
determine that transmitting the second data would not exceed the remaining amount of the transmit power budget; and
transmit the second data at the specified transmit power level without the delaying.

19. The user device of claim 16, further comprising the sensor disposed on or within the user device, wherein the sensor is at least one of a proximity sensor or an inertial sensor, wherein the user device is at least one of an electronic book reader, a tablet computer, or a mobile phone.

20. The user device of claim 16, further comprising a modem, coupled to the antenna and the processing component, to control the transmission of the first data and the second data at the specified transmit power level when the presence of the object is detected, wherein the processing component resides in the modem.

21. The user device of claim 16, further comprising:
a modem, coupled to the antenna, to transmit the first data and the second data via the antenna according to the specified transmit power level,
wherein the processing component is a processor coupled to the modem, and
wherein the processor executes the power manager, and wherein the processor is configured to:
detect the presence of the object that absorbs electromagnetic radiation; and
instruct the modem to transmit the first data and the second data.

22. A computer readable storage medium including instructions that, when executed by a processing device, cause the processing device to perform operations comprising:
transmitting first data at a specified transmit power level;
detecting a presence of an object that absorbs electromagnetic radiation; and
in response to the detection of the presence of the object,
determining a remaining amount of a transmit power budget,
calculating an amount of data that can be transmitted without exceeding the remaining amount, and
transmitting second data at the specified transmit power level according to the calculated amount of data.

23. The computer readable storage medium of claim 22, wherein the operations further comprise:
determining a type of application using the first data;
when the type of application is a first type, performing the calculating and the transmitting the second data; and
when the type of application is a second type,
determining that transmitting the second data would exceed the remaining amount of the transmit power budget, and
delaying a specified amount of time.

* * * * *